US012299768B2

(12) United States Patent
Livesley et al.

(10) Patent No.: US 12,299,768 B2
(45) Date of Patent: May 13, 2025

(54) MULTICORE MASTER/SLAVE COMMUNICATIONS

(71) Applicant: Imagination Technologies Limited, Kings Langley (GB)

(72) Inventors: Michael John Livesley, Hertfordshire (GB); Ian King, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 156 days.

(21) Appl. No.: 18/127,579

(22) Filed: Mar. 28, 2023

(65) Prior Publication Data

US 2023/0410243 A1   Dec. 21, 2023

(30) Foreign Application Priority Data

Mar. 30, 2022 (GB) ........................... 2204508
Mar. 30, 2022 (GB) ........................... 2204510

(51) Int. Cl.
   *G06T 1/20*       (2006.01)
   *G06F 9/48*       (2006.01)
   *G06F 15/80*      (2006.01)
(52) U.S. Cl.
   CPC .............. *G06T 1/20* (2013.01); *G06F 9/4881* (2013.01); *G06F 15/80* (2013.01)
(58) Field of Classification Search
   CPC . G06T 1/20; G06T 1/60; G06F 9/4881; G06F 9/505; G06F 9/5066; G06F 9/544; G06F 15/80

(Continued)

(56) References Cited

U.S. PATENT DOCUMENTS 8,074,224 B1      12/2011  Nordquist et al.
10,275,851 B1 *    4/2019  Zhao .................. G09G 5/363

(Continued)

FOREIGN PATENT DOCUMENTS

CN      105261066 A      1/2016
CN      109978751 A      7/2019

(Continued)

OTHER PUBLICATIONS

Anonymous; "Graphics—SGX543MP4"; Retrieved from the Internet: URL:https://www.psdevwiki.com/vita/Graphics; Sep. 13, 2020; pp. 1-9.

(Continued)

*Primary Examiner* — Jacinta M Crawford
(74) *Attorney, Agent, or Firm* — Potomac Law Group, PLLC; Vincent M DeLuca

(57) ABSTRACT

A master unit in a core of a plurality of cores in a graphics processing unit receives a set of image rendering tasks, assigns a first subset of the image rendering tasks to a first core of the plurality of cores and assigns a second subset of the image rendering tasks to a second core of the plurality of cores. The master unit transmits the first subset of image rendering tasks to a slave unit of the first core and transmits the second subset of image rendering tasks to a slave unit of the second core. The master unit stores a credit number for each of the first and second cores and adjusts the credit number of the first and second cores by a first amount for each task in the first and second subset of the image rendering tasks. The slave units transmit credit notifications when tasks have been processed and the master unit adjusts the credit numbers when it receives the notifications.

20 Claims, 19 Drawing Sheets

(58) Field of Classification Search
USPC .......................................................... 345/501
See application file for complete search history.

(56) References Cited

U.S. PATENT DOCUMENTS

| | | | |
|---|---|---|---|
| 2007/0091099 A1* | 4/2007 | Zhang | G06T 15/005 345/501 |
| 2011/0109638 A1 | 5/2011 | Duluk, Jr. et al. | |
| 2015/0254102 A1* | 9/2015 | Ueda | G06F 9/4881 718/102 |
| 2017/0236244 A1 | 8/2017 | Price | |
| 2018/0211435 A1 | 7/2018 | Nijasure et al. | |
| 2018/0276876 A1 | 9/2018 | Yang et al. | |
| 2019/0355084 A1 | 11/2019 | Gierach et al. | |
| 2020/0097293 A1 | 3/2020 | Havlir et al. | |
| 2021/0097013 A1 | 4/2021 | Saleh et al. | |
| 2021/0158598 A1 | 5/2021 | Bratt et al. | |
| 2021/0241416 A1 | 9/2021 | Cerny | |
| 2022/0083384 A1 | 3/2022 | Cerny | |
| 2022/0319089 A1* | 10/2022 | Nemlekar | G06T 15/005 |

FOREIGN PATENT DOCUMENTS

| | | |
|---|---|---|
| CN | 112862661 A | 5/2021 |
| EP | 1287494 A1 | 3/2003 |
| EP | 2548171 A1 | 1/2013 |
| EP | 3547248 A1 | 10/2019 |
| EP | 3796263 A1 | 3/2021 |
| EP | 3862975 A1 | 8/2021 |
| GB | 2547252 A | 8/2017 |
| GB | 2594764 A | 11/2021 |
| WO | 2009/068895 A1 | 6/2009 |
| WO | 2018/114957 A1 | 6/2018 |

OTHER PUBLICATIONS

Beets; "A look at the PowerVR graphics architecture: Tilebased rendering"; Retrieved from the Internet: URL:https://blog.imaginationtech.com/a-look-at-the-powervr-graphics-architecture-tile-based-rendering/; Apr. 2, 2015; pp. 1-12.

Beets; "A look at the PowerVR graphics architecture"; Retrieved from the Internet: URL:https://blog.imaginationtech.com/the-dr-in-tbdr-deferred-rendering-in-rogue/; Jan. 28, 2016; pp. 1-13.

Beets; "Introducing Furian: the architectural changes"; Retrieved from the Internet: URL:https://blog.imaginationtech.com/introducing-furian-the-architectural-changes/; Mar. 13, 2017; pp. 1-13.

Yu et al; "A Credit-Based Load-Balance-Aware CTA Scheduling Optimization Scheme in GPGPU"; International Journal of Parallel Programming; vol. 44; No. 1; Aug. 22, 2014; 21 pages.

Imagination Technologies: "Tiling positive or how Vulkan maps to PowerVR GPUs"; Retrieved from the Internet: URL: https%3A%2F%2Fblog.imaginationtech.com%2Ftiling-positive-or-how-vulkan-maps-to-powervr-gpus%2F; Mar. 9, 2016; pp. 1-13.

Kayhan; "Chasing Triangles in a Tile-based Rasterizer"; Retrieved from the Internet: URL:https://tayfunkayhan.wordpress.com/2019/07/26/chasing-triangles-in-a-tile-based•- rasterizer/; Jul. 29, 2019; pp. 1-18.

\* cited by examiner

MULTICORE MASTER/SLAVE COMMUNICATIONS

CLAIM OF PRIORITY

This application claims foreign priority under 35 U.S.C. 119 from United Kingdom patent application Nos. GB 2204508.2 and GB 2204510.8, each filed on 30 Mar. 2022, which are herein incorporated by reference in their entirety.

BACKGROUND

In computer graphics, "rendering" is the process of converting a 3D model, describing a virtual scene, into one or more 2D images, representing a view of the scene from a specific viewpoint (or viewpoints). As this is a computationally intensive process, for typical virtual scenes, it is common to provide a hardware accelerator that is specialised in carrying out the necessary computations. This kind of hardware accelerator is known in the art as a graphics processing unit (GPU).

Different GPUs may have different hardware architectures, reflecting different strategies for carrying out the computations necessary for 3D rendering. One exemplary GPU uses a "tile-based deferred rendering" pipeline.

This approach separates the rendering process into two distinct stages. Firstly, geometry data, describing the 3-D model of the scene, is processed to transform it from the 3-D space into the 2-D coordinates of the image, based on the particular viewpoint to be rendered. This will be referred to as the geometry processing stage (or simply "geometry processing", for short). The output of this stage is transformed geometry, which is stored in a "parameter buffer" in so-called "parameter blocks".

The transformed geometry in the parameter buffer will be used to define "fragments". Therefore, the second stage is referred to as the fragment shading or fragment processing stage. It may also be referred to as the "3D" stage, or simply as "fragment processing".

In the second stage, the transformed geometry data is read from the parameter buffer and rasterised—meaning converted to fragments and mapped to pixels. As part of this process, depth-testing is performed to determine what fragments are actually visible at each pixel (or sample position, if there is not a one-to-one correspondence between sample positions and pixels). In a deferred rendering system, only when the system has determined what fragments are visible does the GPU proceed to retrieve texture data (containing colour information) for the relevant visible fragments. A shader program is run for each visible fragment, and the shaded fragments are used to determine the pixel values to be displayed.

In the past, rendering work has been performed in parallel on multiple cores by connecting the cores in a multicore system to a central hub (via separate, dedicated connections). The central hub assigns work to each core and includes a shared cache that can be accessed by all of the cores. The central hub distributes rendering tasks to the cores of the multicore system, for example, as processing capacity on each core becomes available, coordinating them in order to process rendering tasks in parallel.

Due to the increased speed and bandwidth of modern graphics processing units, the central hub system is no longer a practical means by which parallel processing can be implemented. One issue faced by the central hub system is that of chip space—the dedicated connections between the central hub and the cores do not directly contribute to the processing of rendering tasks. However, they take up chip space that could be used for another core.

Another related issue is that of scalability. While additional cores could be added to the multicore system to improve its performance, this would also increase the number of dedicated connections required and the complexity of the chip layout.

It would be desirable to develop a multi-core GPU that made more efficient use of chip space and could achieve a higher degree of parallelisation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A multicore graphics processing unit (GPU) and a method of operating a GPU are provided. The GPU comprises at least a first core and a second core. At least one of the cores in the multicore GPU comprises a master unit configured to receive a set of image processing tasks, assign a first subset of the tasks to the first core and assign a second subset of the tasks to the second core, transmit the first subset to the first core and transmit the second subset to the second core.

According to one aspect, there is provided a graphics processing unit, hereinafter GPU, comprising a plurality of cores, wherein each core of the plurality of cores comprises a slave unit configured to manage the execution of image rendering tasks within the core, and wherein at least one of the plurality of cores further comprises a master unit configured to:

receive a set of image rendering tasks;
assign a first subset of the image rendering tasks to a first core of the plurality of cores;
assign a second subset of the image rendering tasks to a second core of the plurality of cores;
transmit the first subset of the image rendering tasks to the slave unit of the first core; and
transmit the second subset of the image rendering tasks to the slave unit of the second core.

The master unit is responsible for assigning and distributing work to at least the first and second cores. The master unit may receive the set of image rendering tasks from an application driver.

The first core or the second core may comprise the master unit. Alternatively, a third core may comprise the master unit. The master unit may assign a subset of image rendering tasks to the core it is in. Where the master unit is in a third core, the master unit may assign a third subset of image rendering tasks to the third core.

The first subset of image rendering tasks consists of different tasks than the second subset of image rendering tasks. In other words, a task assigned to one core is not also assigned to another core.

Each of the plurality of cores may be identical. This means that each core can contain the same components—in particular, the same master and slave units, meaning that each slave unit and each master unit in a core has an identical counterpart unit in each of the other cores. Where the cores are identical, the master units of all but one of the cores may be inactive.

Each of the cores may comprise more than one master unit, and at least the same number of slave units. Each active master unit is responsible for assigning work to one slave unit in each core. No two active master units will assign work to the same slave unit in a core. For example, a first master unit may assign subsets of a first set of tasks to the first slave unit of each core, and a second master unit may assign subsets of a second set of tasks, being of a different type of task than the first set of tasks, to the second slave unit of each core. In an example, the first set of tasks could be fragment processing tasks, while the second set of tasks could be geometry processing tasks. In an example in which each core comprises two master units, both master units of one of the cores might be active, while the master units of the other cores might be inactive. Alternatively, only one master unit in a core might be active along with one master unit of another core, while all remaining master units are inactive. Alternatively, the cores might each comprise a single master unit, and each core might comprise at least the same number of slave units as there are active master units in the graphics processing system. For example, if the first and second cores comprise active master units then each of the cores may comprise two slave units (a first and a second slave unit in each core). The master unit of the first core may assign work to the first slave units in the cores, and the master unit of the second core may assign work to the second slave units in the cores.

The slave unit of the first core may be configured to transmit to the master unit a first credit notification when a task in the first subset of the image rendering tasks has been processed. The slave unit of the second core may also be configured to transmit to the master unit a second credit notification when a task in the second subset of the image rendering tasks has been processed. The master unit may be configured to: store a credit number for each of the first and second cores; adjust the credit number of the first core by a first amount for each task in the first subset of the image rendering tasks when the master unit assigns the first subset of the image rendering tasks to the first core; adjust the credit number of the second core by the first amount for each task in the second subset of the image rendering tasks when the master unit assigns the second subset of the image rendering tasks to the second core; adjust the credit number of the first core by a second amount when the master unit receives the first credit notification; and adjust the credit number of the second core by the second amount when the master unit receives the second credit notification, wherein one of the first and second amounts is positive, and the other is negative.

By changing the credit number of each core by a set amount for each task assigned to that core, the master unit may keep track of how many tasks it has assigned to each core, and by extension which core has been assigned the most tasks. By changing the credit number of a core in the opposite way for each task that the core reports as being completed, the master unit may keep track of how busy each core is at the present time.

The first and second values may be equal in magnitude. For example, where the first value is a positive integer, the second value may be the negative of that integer. Depending on whether the first amount is positive or negative, a high credit number indicates that the core is busy and a low credit number indicates that the core is not busy (or vice versa). For example, where the first amount is positive, a core with a more positive credit number is busier than a core with a less positive credit number.

Where the GPU comprises more than two cores, the master unit can maintain credit numbers for those additional cores in the same way.

The master unit may be configured to: assign a subsequent image rendering task to the slave unit of the core with the least work currently assigned to it, based on the credit number of each of the cores; adjust the credit number of the core to which the subsequent image rendering task has been assigned by the first amount; and transmit the subsequent image rendering task to the slave unit of the core to which it has been assigned.

Where the first amount is positive, the core with the most negative credit number is the core with the least work currently assigned to it. Wherein the first amount is negative, the core with the most positive credit number is the core with the least work currently assigned to it.

By assigning a new task to the core with the fewest pending tasks, as indicated by the credit numbers of the cores, the master unit can avoid loading one core with work while another core runs out of work and possibly becomes idle. Rather, the master unit may assign more work to the core running out of work, preventing it from becoming idle and maintaining a better balance of work between the cores. This load balancing helps to maintain the parallel processing of the image rendering tasks for longer, improving the performance of the graphics processing unit. The credit numbers of each of the cores may be initialised with the same value.

Where each of the cores has more than one slave unit, and the graphics processing unit comprises one active master unit for each slave unit in a core, each active master unit may store a credit number for one of the slave units in each of the cores. Each master unit may store a credit number for different slave units.

The first core may comprise a first number of available processing units (referred to herein as PUs) configured to perform rendering operations, and the second core may comprise a second number of available PUs configured to perform rendering operations. The master unit may assign image rendering tasks to the first and second cores in direct relation to the first and second numbers of available PUs.

The master unit may assign image rendering tasks to each core in proportion to the number of available PUs in that core. The master unit may weight the credit number of the first and second cores based on the first and second numbers of available PUs. The master unit may weight the credit number of the first and second cores in proportion to the first and second numbers of available PUs. The master unit may weight the credit numbers such that when each core has the same number of tasks to process as it has available PUs, the credit numbers for the first and second cores are the same. For example, a core with eight available PUs each assigned one task might have a credit number of +8. A second core with four PUs, each assigned one task, might also have a weighted credit number of +8. More generally, the credit number of each core may be weighted to reflect how busy the core is in proportion to the number of available PUs in the core.

Where the master unit weights the credit number of each core based on the number of available PUs in that core, the master unit may assign a subsequent image rendering task to the core with the least work, as indicated by the credit numbers of the cores.

Where the master unit does not weight the credit number of each core to account for the first and second numbers of available PUs, and where the credit number for each core is the same, the master unit may assign a subsequent image rendering task to the core with the larger number of available PUs.

The slave units of the first and second cores may notify the master unit of the first and second numbers of available PUs before the master unit assigns any rendering tasks to the cores. The number of available PUs may be configured by an application, and may be less than the number of PUs in the core. The number of available PUs may change over the course of image rendering. The cores may update the master unit when their number of available PUs changes, and the master unit may adjust the credit number for the cores accordingly.

The first subset of the image rendering tasks may comprise a first task, wherein the first task is a task on which a dependent task depends. The master unit may be configured to include, in the first subset of the image rendering tasks and following the first task, a task completion update command. The slave unit of the first core may be configured to send a first task completion update to the master unit when the first core processes the task completion update command. The master unit may be configured to assign and transmit a dependent task of the first task to one of the slave units of the first and second cores only after the master unit has received the first task completion update. The dependent task of the first task is a task that depends on the results of the first task.

In the same way, if the second subset of image rendering tasks comprises a first task (a task on which a dependent task depends), the master unit may include a task completion update command in the second subset and after the first task. The slave unit of the second core may be configured to send a second task completion update when it processes the task completion update command.

A dependent task of the first task is any image rendering task that can only be properly processed once an earlier first task has been completed. This can occur, for example, when the dependent task requires the output of the first task as an input. Any one or more of the tasks in the first and/or second subset of image rendering tasks may be a first task, and the term "first task" does not refer to a position of the task in the first or second subset of image rendering tasks.

The task completion update notifies the master unit that all of the tasks in the subset of tasks preceding the task completion update command have been executed. By including the task completion update command after the first task, the task completion update informs the master unit that the first task has been completed, meaning that the dependent task can now be processed. The task completion update command may immediately follow the first task, such that the core will process the task completion update command immediately after it processes the first task and before it processes any other tasks.

One example of a task completion update command is a work fence command. On processing a work fence command, the slave unit within that core can transmit a fence update to the active master unit that assigned the work to that core.

The task completion update may be distinct from a credit notification transmitted by a slave unit. For example, the slave unit of a core may be configured to send a credit notification every time the core completes a task. In contrast, the slave unit may only send a task completion update when the core processes a task completion update command.

The master unit may be configured to include with the first subset of the image rendering tasks, following the first task and optionally before the task completion update command, a memory flush command. The slave unit of the first core may be configured to write all processed work stored in the first core to a shared memory when the first core processes the memory flush command.

In the same way, if the second subset of image rendering tasks comprises a first task (a task on which a dependent task depends), the master unit may include in the second subset of image processing tasks a memory flush command after the first task and before the task completion update command. The slave unit of the second core may be configured to write all processed work stored in the second core to a shared memory when the slave unit of the second core processes the memory flush command.

By following the first task with a memory flush command, the data generated by the processing of the first task (the output of the first task) is made available to all of the cores by being written (flushed) to the shared memory. This enables any of the cores to process the dependent task of the first task, as they may all access the output data of the first task. The first and second cores can write to the same shared memory.

By placing the flush command before the task completion update command, the task completion update serves not only to inform the master unit that the first task has been completed, but also that the flush has been completed.

Each core in the plurality of cores may comprise a second slave unit configured to manage the execution of a second type of image rendering task by the core. One of the cores may comprise a second master unit configured to: receive a second set of image rendering tasks of the second type; assign a first subset of the second set of image rendering tasks to a first one of the plurality of cores; assign a second subset of the second set of image rendering tasks to a second, different one of the plurality of cores; transmit the first subset of the second set of image rendering tasks to the second slave unit of the first one of the plurality of cores; and transmit the second subset of the second set of image rendering tasks to the second slave unit of the second one of the plurality of cores.

The second set of image rendering tasks consists of image rendering tasks of a different type than the first set of image rendering tasks. For example, the first set of image rendering tasks may be compute tasks and the second set of image rendering tasks may be geometry tasks.

Where a core comprises both the first and second master units, the first and second master units may be implemented as two physically separate units in the core.

In some examples, different cores may contain the first and second master units. For example, the first core may comprise the first master unit and the second core may comprise the second master unit. The second master unit may assign and transmit the first subset of the second set of image rendering tasks to the second slave unit of the first core, and assign and transmit the second subset of the second set of image rendering tasks to the second slave unit of the second core.

In some examples, each of the plurality of cores may comprise a first and second master unit. However, in this case, only one of the first master units and one of the second master units might be active.

In the same way that the active first master unit may maintain a credit number for each core to which it has assigned image rendering tasks, the active second master unit may also maintain a credit number for the cores to which it has assigned tasks. In particular, the first master unit may maintain a credit number for each of the first slave units of the cores (that it has assigned work to) and the second master unit may maintain a credit number for each of the second slave units of the cores (that it has assigned work to). When the first master unit assigns an image rendering task to a core, it may adjust the credit number for that core by the first amount, as described above. The first master unit only adjusts its credit score for each core in response to tasks it has assigned to the core and in response to the core notifying it that one of those tasks has been completed, and the second master unit only adjusts its credit score for each core in response to tasks it has assigned to that core and in response to that core notifying it that one of those tasks has been completed. In this way, two distinct credit numbers may be maintained for each core.

The master unit may be configured to output first and second register write commands. The first register write command may be addressed to the first core and may comprise an indication of the first subset of the image rendering tasks. The second register write command may be addressed to the second core and may comprise an indication of the second subset of the image rendering tasks. The plurality of cores may be connected by a register bus configured to communicate register write commands between the cores.

Multi-core systems may comprise a register bus that connects each of the cores, enabling register information to be communicated between the cores. By utilising this register bus to communicate image rendering tasks between the cores, the need for dedicated connections between the cores may be removed, saving space on chip.

The master unit may address a register write command to the core to which it has assigned each subset of the image rendering tasks. Where the master unit assigns a subset of tasks to the core in which it resides, it may address a register write command containing an indication of those tasks to that core.

The master unit may transmit the register write commands to the various cores directly, or may output the register write commands to another unit in the core comprising the master unit for transmission. Where each core comprises multiple slave units, the register write command may be addressed to a specific slave unit in a specific core. The register write command may contain an address in memory where the slave unit may obtain the necessary data to process the image rendering tasks.

Where the slave units of the cores are configured to transmit credit notifications and/or task completion updates, these may be in the form of register write commands addressed to the master unit (or to the core comprising the master unit), or register read commands addressed to the master unit (or to the core comprising the master unit).

The core comprising the master unit may further comprise an arbiter unit in communication with the master unit and the slave unit of the core. The arbiter unit may be configured to: receive the register write commands from the master unit; and for each register write command: if the register write command is addressed to the core comprising the master unit, pass the register write command to the slave unit of the core comprising the master unit; and if the register write command is not addressed to the core comprising the master unit, forward the register write command for transmission over the register bus.

In other words, the arbiter unit may be configured to route tasks that were assigned to the slave unit of the core comprising the master unit (by the master unit) to said slave unit without transmitting them over the register bus. Subsets of tasks assigned to any core other than the core comprising the master unit, are not routed to the slave unit of the core comprising the master unit. Rather, they are forwarded by the arbiter unit for transmission over the register bus. This can mean that they are forwarded to another hardware unit in the core comprising the master unit for transmission to the relevant cores over the register bus, or that they are sent directly to the register bus and transmitted to the relevant cores.

In examples in which each core comprises a plurality of slave units, the arbiter unit of the core comprising the master unit may be in communication with each slave unit of the core comprising the master unit, and may route tasks assigned to any one of the slave units of the core comprising the master unit to that slave unit. The master unit may address tasks to a specific slave unit by using a specific register address associated with that slave unit.

Each core may comprise an arbiter unit as described above, in communication with all of the master and slave units of that core. Where a core receives, over the register bus, a register write command addressed to a slave unit of that core, the arbiter unit in that core may route the register write command to the slave unit to which the register write command is addressed. In this way, the slave unit receives the subset of work assigned to it.

Where the slave units of the cores are configured to transmit one or more of credit notifications, CFI notifications and task completion updates, the respective arbiter units of the first and second cores may be configured to forward the CFI notification, task completion update and/or credit notification to the register bus, over which they can each be transmitted to the master unit, or where there are multiple active master units, to the relevant active master unit. The core comprising the master unit may be configured to receive from the slave units of the cores a credit notification, task completion update or CFI notification. The arbiter unit of the core comprising the master unit may be configured to send the credit notification, task completion update or CFI notification to the master unit. The credit notification, task completion update or CFI notification may be in the form of a register read command or a register write command, addressed to the core comprising the master unit. The register read/write command may contain information enabling the master unit to identify which core sent the command. In one example, this could be the use of a specific register address associated with the core comprising the master unit. The arbiter units of the first and second cores may forward, to the register bus, the communications to be sent by the first/second cores to the master unit (if the master unit is in another core). The arbiter unit of the first/second core may determine whether the credit notification, task completion update or CFI notification is addressed to its own core, in which case it may send the credit notification, task completion update or CFI notification to its master unit. As explained above, forwarding for transmission may mean forwarding to another hardware unit in the core or forwarding directly to the register bus for transmission over the register bus to the relevant core.

The plurality of cores may each comprise an interface unit in communication with the register bus. The interface unit of the core comprising the master unit may be configured to: receive the first and second register write commands; and transmit, over the register bus, the first register write command to the first core and the second register write command to the second core.

The interface unit of the first core may be configured to: receive, via the register bus, the first register write command; and forward the first register write command to the slave unit of the first core.

The interface unit of the second core may be configured to: receive, via the register bus, the second register write command; and forward the second register write command to the slave unit of the second core.

Each interface unit may be a system on chip interface (SOCIF). The interface unit of the core comprising the master unit may receive, from the slave unit of the same core (or over the register bus from another core) one of a credit notification, CFI notification and task completion update in the form of a register read write command, and may pass this to the master unit (either directly, or via the arbiter unit).

Forwarding the register write command to a slave unit may mean sending it directly to the slave unit to which it is addressed, or sending it via another unit or units within the core, such as the arbiter unit.

The interface unit of the first core may be configured to determine whether the first register write command is addressed to a first reserved register address; and if the first register write command is addressed to the first reserved register address, forward the first register write command to the slave unit of the first core. The interface unit of the second core may be configured to determine whether the second register write command is addressed to a second reserved register address; and if the second register write command is addressed to the second reserved register address, forward the second register write command to the slave unit of the second core.

A reserved register address is a register address that the interface units of the cores have been configured only to use for master-slave communications. When an interface unit receives a register read/write command addressed to a reserved register address, instead of simply reading/writing data from/to a register it will pass the data to the master or slave unit of the core, as appropriate according to the address. If a register read/write command does not use a reserved register address then the interface unit will treat it as a conventional register read/write command (meaning that it will not be forwarded to the slave unit of the core). In this way, the interface unit may distinguish between a conventional register read/write command and a master-slave communication.

Each core may have more than one reserved register address associated with it. For example, the first core may be associated with a first reserved register address for a slave unit and a second register address for a master unit in the first core. In general, each slave unit in each core may be associated with a unique reserved register address. Likewise, each master unit in each core may be associated with a unique reserved register address.

Communications sent from the slave units, such as credit notifications and task completion updates, may also be addressed to reserved register addresses, and the interface unit of the core comprising the master unit may only send these communications to the master unit if they are addressed to a reserved register address associated with the master unit.

Forwarding a register write command to a slave unit may mean forwarding it directly to that slave unit, or forwarding it to that slave unit indirectly via another hardware unit such as an arbiter unit.

The plurality of cores may each comprise the same number of master units, and may each comprise the same number of slave units.

The cores of the graphics processing system may be physically identical, meaning that they comprise the same components—in particular, the master components in each core may be identical, and the slave components in each core may be identical. The cores may be able to operate independently in single core systems or configurations, because each core possesses a slave unit and a master unit.

The first core or the second core may comprise the master unit.

According to another aspect, there is provided a method of transmitting image rendering tasks in a graphics processing unit comprising a plurality of cores, the method comprising:
  receiving, by a master unit in a core of the plurality of cores, a set of image rendering tasks;
  assigning, by the master unit, a first subset of the image rendering tasks to a first core of the plurality of cores;
  assigning, by the master unit, a second subset of the image rendering tasks to a second core of the plurality of cores;
  transmitting, by the master unit, the first subset of image rendering tasks to a slave unit of the first core; and
  transmitting, by the master unit, the second subset of image rendering tasks to a slave unit of the second core.

The method may further comprise: storing, by the master unit, a credit number for each of the first and second cores; adjusting, by the master unit, the credit number of the first core by a first amount for each task in the first subset of image rendering tasks; and adjusting, by the master unit, the credit number of the second core by the first amount for each task in the second subset of image rendering tasks; transmitting, by the slave unit of the first core to the master unit, a first credit notification when a task in the first subset of image rendering tasks has been processed; transmitting, by the slave unit of the second core to the master unit, a second credit notification when a task in the second subset of image rendering tasks has been processed; adjusting, by the master unit, the credit number of the first core by a second amount when the master unit receives the first credit notification; and adjusting, by the master unit, the credit number of the second core by the second amount when the master unit receives the second credit notification, wherein one of the first and second amounts is positive, and the other is negative.

The method may further comprise: assigning, by the master unit, a subsequent image rendering task to the slave unit of the core with the least work currently assigned to it, based on the credit number of each of the cores; adjusting, by the master unit, the credit number of the core to which the subsequent image rendering task has been assigned by the first amount; and transmitting, by the master unit, the subsequent image rendering task to the slave unit of the core to which it has been assigned.

The method may further comprise: assigning image rendering tasks to the first and second cores in direct relation to a first number of available processing units, referred to herein as PUs, and to a second number of available PUs, wherein the first number of available PUs is the number of available PUs in the first core and the second number of available PUs is the number of available PUs in the second core.

The method may further comprise weighting, by the master unit, the credit number of the first core based on the first number of available PUs, and the credit number of the second core based on the second number of available PUs.

The method may further comprise: including, by the master unit, after a first task in the first subset of the image rendering tasks, a task completion update command; processing, by the first core, the first task; processing, by the first core, the task completion update command; and transmitting, by the slave unit of the first core, a task completion update to the master unit; assigning, by the master unit, a dependent task of the first task to one of the slave units of the first and second cores; and transmitting, by the master unit, the dependent task to the core to which it has been assigned.

In the same way, the method may comprise including (by the master unit) a task completion update command in the second subset of the image rendering tasks, and after a first task, and transmitting (by the slave unit of the second core) a task completion update when the slave unit of the second core processes the task completion update command.

The method may further comprise: including, by the master unit, after the first task in the first subset of the image rendering tasks and optionally before the task completion update command, a memory flush command; processing, by the first core, the memory flush command; and writing, by the slave unit of the first core, all output data stored in the first core to a shared memory.

In the same way, the method may comprise including (by the master unit) a memory flush command in the second subset of the image rendering tasks, and after a first task (and optionally before the task completion update command), and writing (by the slave unit of the second core) all processed memory stored in the second core to a shared memory. The first and second cores may write to the same shared memory, or to different shared memories.

The method may further comprise: receiving, by a second master unit in any one of the plurality of cores, a second set of image rendering tasks of a second type; assigning, by the second master unit, a first subset of the second set of image rendering tasks to the first core; assigning, by the second master unit, a second subset of the second set of image rendering tasks to the second core; transmitting, by the second master unit, the first subset of the second set of image rendering tasks to a second slave unit of the first core; and transmitting, by the second master unit, the second subset of the second set of image rendering tasks to a second slave unit of the second core.

The transmitting of the first and second subsets may comprise outputting, by the master unit, first and second register write commands. The first register write command may be addressed to the first core and may comprise an indication of the first subset of the image rendering tasks. The second register write command may be addressed to the second core and may comprise an indication of the second subset of the image rendering tasks. The plurality of cores may be connected by a register bus for communicating the register write commands between the cores.

The transmitting may further comprise: receiving, by an arbiter unit of the core comprising the master unit, from the master unit, the plurality of register write commands; and for each register write command: if the register write command is addressed to the core comprising the master unit, sending by the arbiter unit the register write command to the slave unit of the core comprising the master unit; and if the register write command is not addressed to the core comprising the master unit, forwarding by the arbiter unit the register write command to the register bus.

If a register write command is not addressed to the core comprising the master unit, the arbiter unit may forward the register write command to another hardware unit in the core comprising the master unit, for onward transmission over the register bus to the relevant other core. Alternatively, the arbiter unit may forward the command directly to the register bus for transmission to the relevant core.

The transmitting may further comprise: receiving, by an interface unit of the core comprising the master unit, the first and second register write commands; transmitting, by the interface unit of the core comprising the master unit over the register bus, the first register write command to the first core and the second register write command to the second core; receiving, by the interface unit of the first core, the first register write command; forwarding, by the interface unit of the first core, the first register write command to the slave unit of the first core; receiving, by the interface unit of the second core, the second register write command; and forwarding, by the interface unit of the second core, the second register write command to the slave unit of the second core.

Forwarding the register write command to a slave unit may mean sending it directly to the slave unit to which it is addressed, or sending it via another unit or units within the core, such as the arbiter unit.

The method may further comprise: determining, by the interface unit of the first core, whether the first register write command is addressed to a first reserved register address; and if the first register write command is addressed to the first reserved register address, forwarding the first register write command to the slave unit of the first core; determining, by the interface unit of the second core, whether the second register write command is addressed to a second reserved register address; and if the second register write command is addressed to the second reserved register address, forwarding the second register write command to the slave unit of the second core.

Each core, and optionally each slave unit and slave unit within each core, may be associated with a different reserved register address.

Also provided is a graphics processing system comprising a GPU as summarised above and/or configured to perform a method as summarised above. The graphics processing system may be embodied in hardware on an integrated circuit.

Also provided is a method of manufacturing, using an integrated circuit manufacturing system, a graphics processing system as summarised above.

Also provided is a method of manufacturing, using an integrated circuit manufacturing system, a graphics processing system as summarised above, the method comprising: processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

Also provided is computer readable code configured to cause a method as summarised above to be performed when the code is run. Also provided is a computer readable storage medium (optionally non-transitory) having encoded thereon the computer readable code.

Also provided is an integrated circuit definition dataset that, when processed in an integrated circuit manufacturing system, configures the integrated circuit manufacturing system to manufacture a graphics processing system as summarised above.

Also provided is a computer readable storage medium having stored thereon a computer readable description of a graphics processing system as summarised above that, when processed in an integrated circuit manufacturing system, causes the integrated circuit manufacturing system to manufacture an integrated circuit embodying the graphics processing system.

Further provided is a computer readable storage medium (optionally non-transitory) having stored thereon a computer readable description of a graphics processing system as summarised above which, when processed in an integrated circuit manufacturing system, causes the integrated circuit manufacturing system to: process, using a layout processing system, the computer readable description of the graphics processing system so as to generate a circuit layout description of an integrated circuit embodying the graphics processing system; and manufacture, using an integrated circuit generation system, the graphics processing system according to the circuit layout description.

Still further provided is an integrated circuit manufacturing system configured to manufacture a graphics processing system as summarised above.

Also provided is an integrated circuit manufacturing system comprising:
 a computer readable storage medium (optionally non-transitory) having stored thereon a computer readable description of a graphics processing system as summarised above;
 a layout processing system configured to process the computer readable description so as to generate a circuit layout description of an integrated circuit embodying the graphics processing system; and
 an integrated circuit generation system configured to manufacture the graphics processing system according to the circuit layout description.

The layout processing system may be configured to determine positional information for logical components of a circuit derived from the integrated circuit description so as to generate a circuit layout description of an integrated circuit embodying the graphics processing system The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
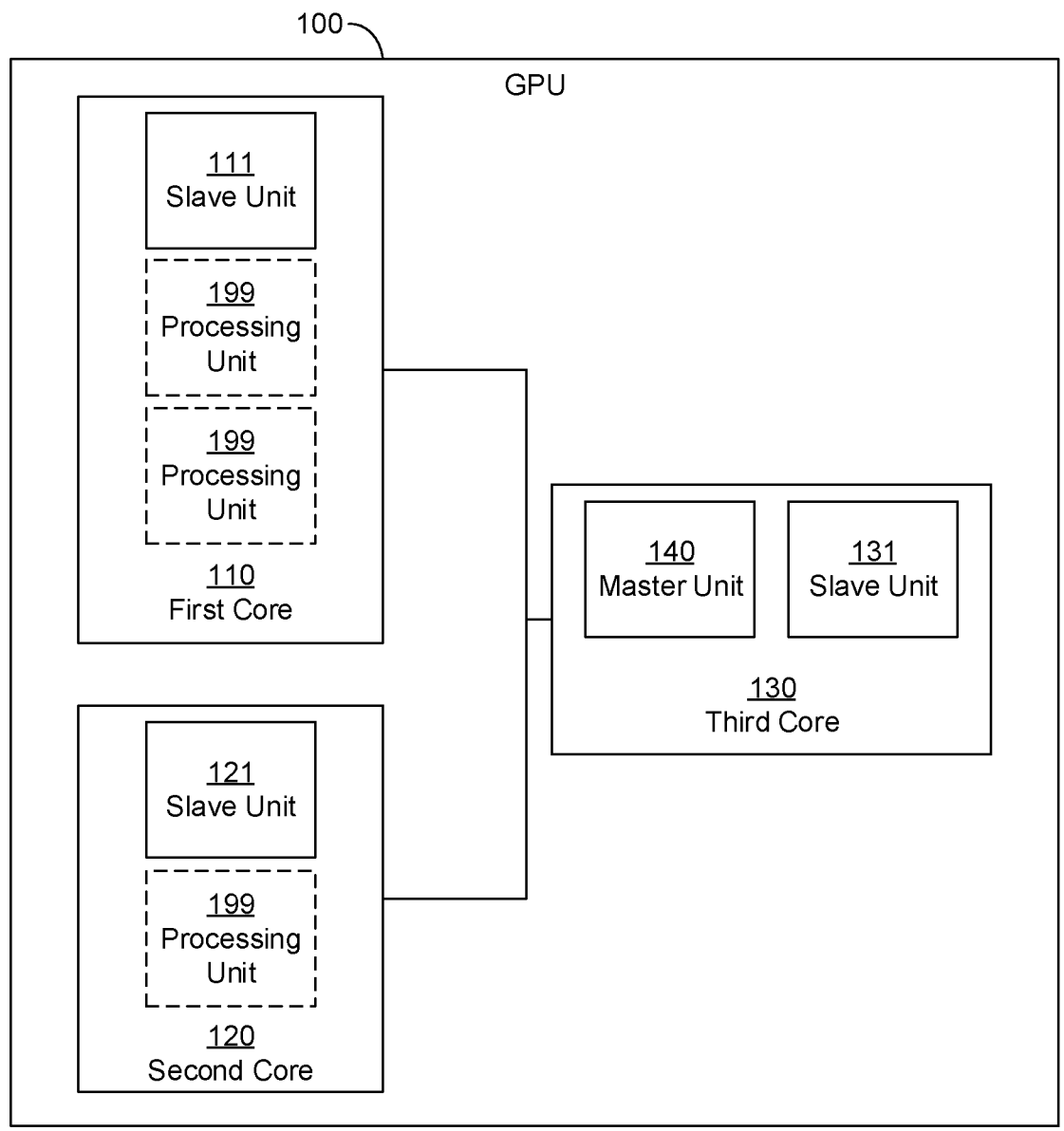
FIG. 1 is a block diagram of a GPU according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

An alternative to the parallel processing system described above, relying on a central hub, is a parallel processing system using a fixed mapping of work to cores. In the fixed mapping system, there is no central hub. Instead of the central hub distributing rendering tasks, tasks are allocated between the cores using a fixed mapping—whereby rendering tasks are assigned to the cores in a predetermined way. A simple example of this in a two core system is to split the scene in half about a vertical axis. One core can be assigned the image rendering tasks for the left half of the scene, while another core is assigned the tasks for the right half of the scene.

While this fixed mapping system addresses some of the problems associated with the central hub, it suffers from skew between the cores, which reduces the degree of parallelisation of the GPU. Skew refers to a difference in processing time between cores. Skew arises when once core finishes its assigned tasks before another core, and becomes idle. The greater the skew, the more time some cores of the GPU are idle, and the less the cores of the GPU are processing tasks in parallel. To achieve the maximum degree of parallelisation skew should be minimised.

Skew is a consequence of the fact that different image rendering tasks have different computational requirements and take different amounts of time to process. It is not possible to determine in advance how long each task will take to process, meaning that although a fixed mapping can easily be configured to ensure that all of the cores are provided with the same number of tasks, it is not possible to distribute tasks according to a fixed mapping such that each core finishes its work at the same time. This means that although the GPU initially processes tasks in parallel, as the cores progress through their workloads some cores inevitably finish before others and become idle. As more cores become idle the degree of parallelisation is reduced and the task processing rate of the GPU reduces.

Another cause of skew is contention within a core. Contention within a core occurs when the core has been assigned multiple tasks that are competing for the resources of that core. For example, consider a first core assigned both geometry processing tasks and fragment processing tasks while a second core is only assigned geometry processing tasks. The second core is able to process its geometry processing tasks, however, if the fragment processing tasks assigned to the first core have been noted as being high priority, the first core will preferentially process these tasks before processing the geometry tasks. This competition between geometry processing tasks and fragment processing tasks in the first core delays the completion of the geometry processing tasks, which can cause delays further down the image processing pipeline.

It would be desirable to address the problems of chip space and skew in order to achieve a high performance multi-core GPU.

An example according to the present disclosure provides a GPU. The GPU comprises a plurality of cores. One of the plurality of cores comprises a master unit responsible for distributing tasks between the cores.

An exemplary GPU is depicted in FIG. 1.

The GPU 100 comprises a first core 110, a second core 120 and a third core 130. Each of the first, second and third cores comprises a slave unit 111, 121, 131. Additionally, in this example, the third core comprises a master unit 140.

The first and second cores (and optionally the third core) may each comprise one or more processing units (PUs) 199. Each processing unit 199 in a core may be in communication with the slave unit(s) of that core. The processing units 199 may be responsible for processing the image rendering tasks. In some examples, the slave units may each comprise the one or more processing units. The one or more processing units may comprise dedicated hardware configured to perform a specific type of image rendering task. For example, a processing unit may comprise dedicated hardware configured to process geometry processing tasks. However, the one or more processing units need not be dedicated to performing a specific type of image rendering task. Rather, they may be capable of performing image rendering tasks of multiple different types. The one or more processing units may, in some examples, be shared in that they are assigned work by different slave units within a core handling different work types.

The master unit 140 is configured to receive a set of image rendering tasks. The master unit 140 is configured to assign a first subset of the image rendering tasks to the first core 110, and assign a second subset of the image rendering tasks to the second core 120. The master unit 140 is configured to transmit the first subset to the slave unit 111 of the first core 110, and transmit the second subset to the slave unit 121 of the second core 120. The master unit 140 may also assign and transmit a third subset of the image rendering tasks to the slave unit 131 of the third core 130.

The slave units 111, 121, 131 of the cores are configured to receive image rendering tasks assigned and transmitted to them by the master unit 140. The slave units 111, 121, 131 may distribute the received image rendering tasks to processing units 199 within their cores for processing.

Figure 2:
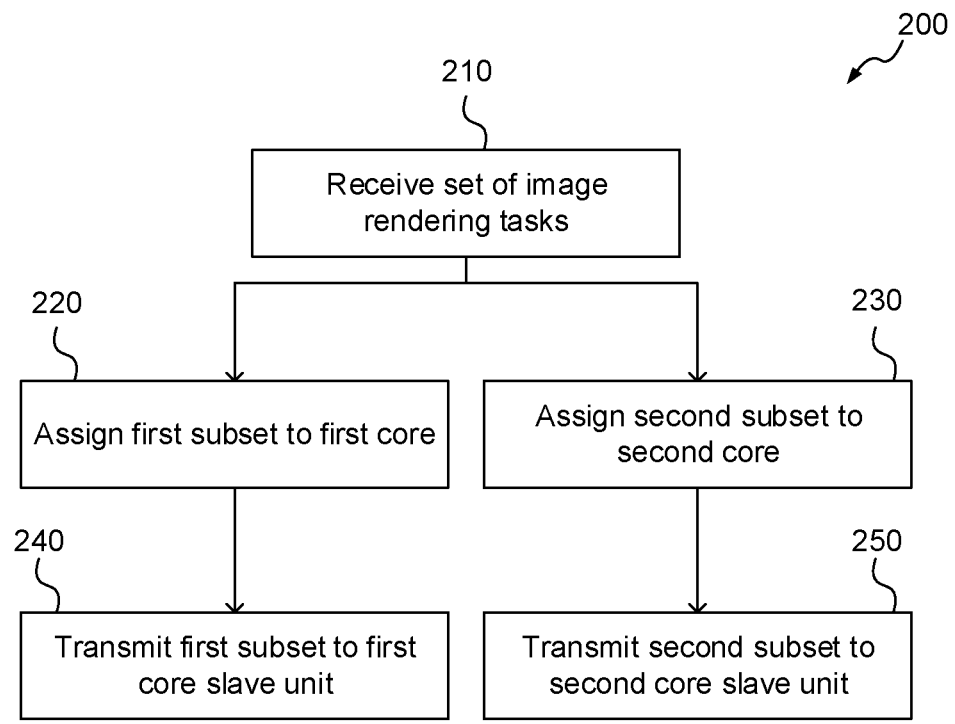
FIG. 2 is a flowchart illustrating a method according to an example.

FIG. 2 is a flow diagram depicting an exemplary method 200 performed by the GPU 100. At step 210, the master unit 140 of the third core 130 receives the set of image rendering tasks. At step 220, the master unit 140 assigns the first subset to the first core 110 and at step 240 the master unit 140 transmits the first subset to the slave unit 111 of the first core. Similarly, at step 230, the master unit 140 assigns a second subset to the second core 120 and at step 250 the master unit 140 transmits the second subset to the slave unit 121 of the second core 120. While step 240 must always occur after step 220, and step 250 must occur after step 230, there is no particular relationship between the left branch (steps 220 and 240) and the right branch (steps 230 and 250) of the flow chart of FIG. 2.

The master unit 140 is responsible for assigning and distributing tasks amongst the cores of the GPU. In other words, the master unit 140 enables the core to which it belongs, i.e. the third core 130 in this example, to assume the work distribution function of the central hub. However, unlike the central hub, which was not capable of performing image rendering tasks, the third core 130 is a fully functioning core and is capable of performing the same types of image rendering tasks as the first and second cores 110, 120. As mentioned above, in some examples of the GPU 100 of FIG. 1, the master unit 140 can assign and transmit a third subset to the third core 130.

Figure 3:
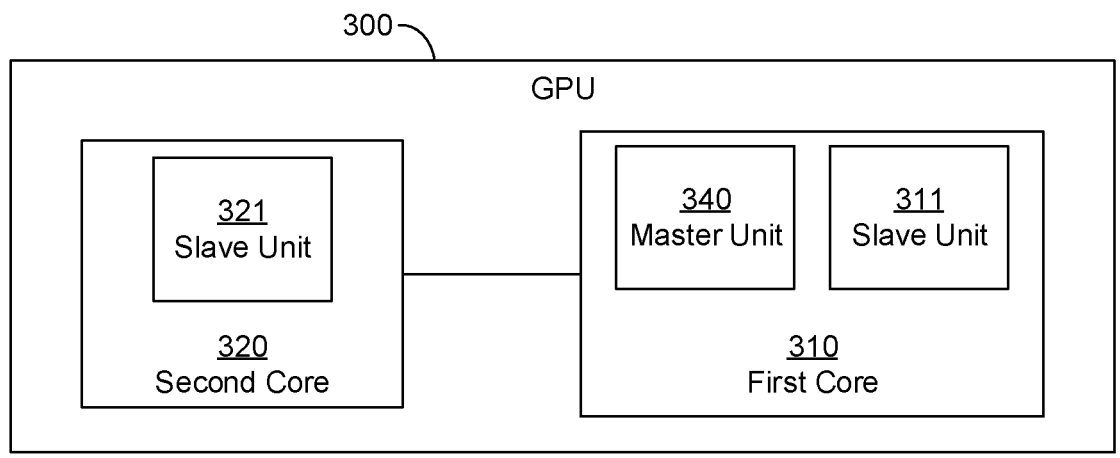
FIG. 3 shows a block diagram of a GPU according to an example.

In the example described above, the third core 130 of the GPU comprised the master unit and the first and second cores 110, 120 processed the tasks. However, this need not always be the case. For example, FIG. 3 depicts a GPU 300 in which the first core 310 comprises a master unit 340 in addition to a slave unit 311. The master unit 340 is configured to assign the first subset to the first core 310 (assigning the first subset to its own core), and to assign the second subset to the second core 320. The master unit 340 is configured to transmit the first subset to the slave unit 311 of the first core 310 and the second subset to the slave unit 321 of the second core 320.

In these ways, not only can one core of the GPU 100/300 assume the work distribution function of the central hub, it can also actively process the image rendering tasks, improving GPU performance and making more efficient use of chip space.

The set of image rendering tasks may be received by the master unit 140/340 from a client driver/application driver, or from another hardware unit in the GPU 100/300.

As explained above, in order to account for the unpredictable variation in the complexity of image rendering tasks (how much "work" is involved in each task) and reduce skew, tasks are assigned dynamically to the cores. The dynamic assignment of tasks means that as skews starts to arise between the cores, the skew can be corrected by providing additional tasks to the core that is processing its tasks more quickly. However, in order to load balance the cores, the master unit 140 requires additional tasks that it can assign to the least busy cores at a later time. For this reason, when first assigning tasks to the cores of the GPU, the master unit 140 may leave some tasks unassigned, reserving them for load balancing. In other words, only a fraction of the total tasks may be assigned to the cores at a given time. In the example of FIG. 1, the master unit 140 may assign less than 50% of the tasks in the set of tasks to the first core 110, and less than 50% to the second core 120. In some examples, the master unit 130 may assign substantially less than 50% of the tasks to any one core at a given time, for example assigning 1% of the tasks in the set of tasks to any one core at any given time, or less than 1%.

Unassigned tasks may be assigned to cores as the cores complete their tasks to compensate for skew. This process achieves load balancing. The load balancing aims to increase the amount of time the cores spend concurrently processing image rendering tasks, and thereby reduce overall processing time. In other words, the load balancing tries to prevent one core from completing its tasks and becoming idle while another core is still processing tasks. This can also be thought of as ensuring that each core is provided the same amount of work to process, in proportion to its processing capability. Where each core has the same processing capability, this means providing the cores with the same amount of work. This is the example we will explore in more detail.

As mentioned above, it is not possible to determine in advance how much work is involved in each task, so it is difficult to provide the cores with the same amount of work. However, by assigning an additional task to the least busy core, the master unit can nonetheless move towards equalising the amount of work currently assigned to each core. By continuing this process over the course of the image rendering, the master unit continuously moves the cores towards having the same amount of work, meaning that the cores will overall have processed the same amount of work and therefore been active for the same amount of time, increasing parallelisation.

In some examples, a credit based system can be used for load balancing. An exemplary implementation of a credit system will be explained in more detail in the context of the GPU 100 of FIG. 1, in an example in which the cores have identical processing capabilities. The principles described below apply irrespective of the number of cores in the GPU or which core comprises the active master unit.

Figure 4:
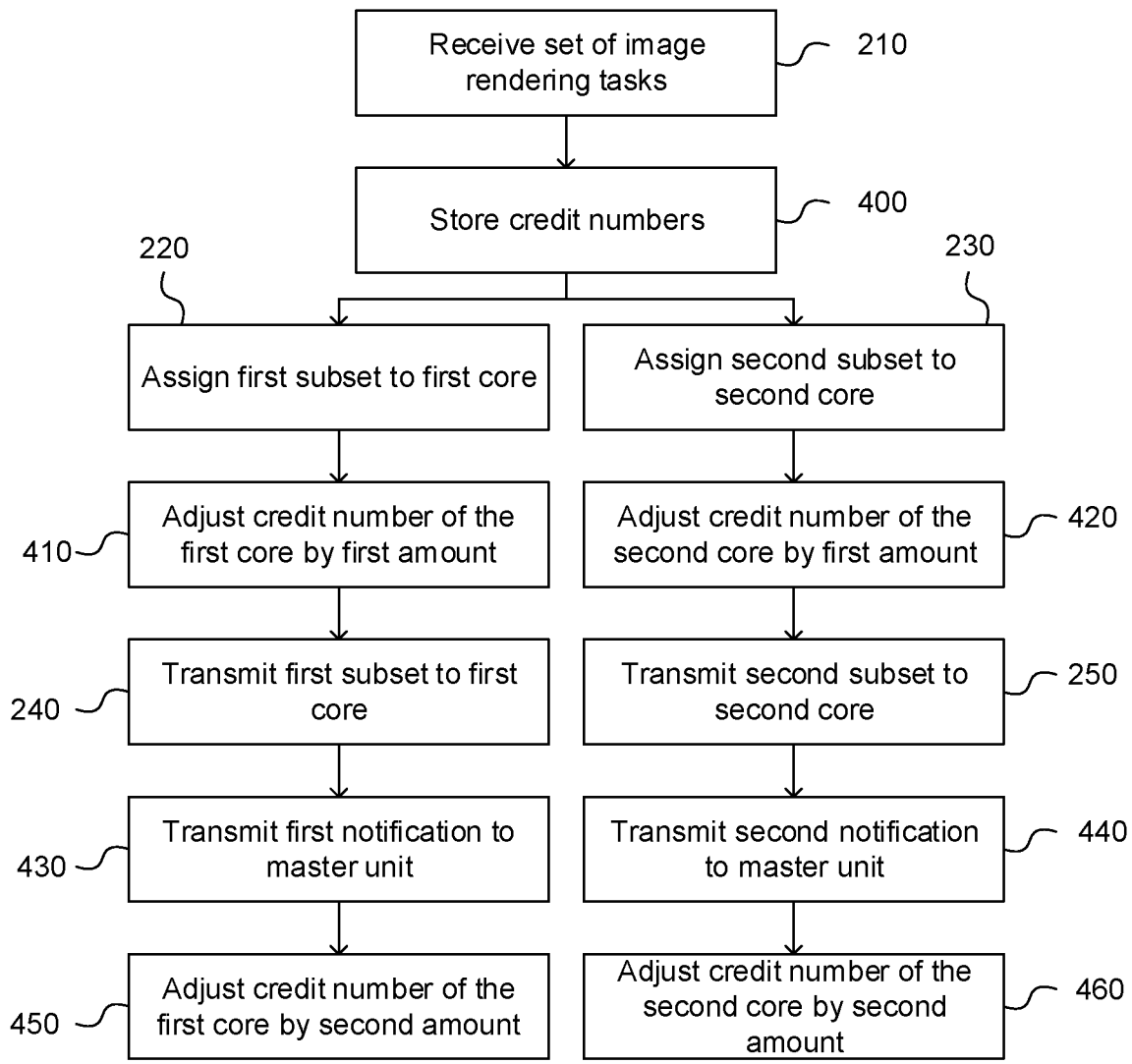
FIG. 4 is a flowchart illustrating a method according to an example.

The master unit 140 can be configured to store a credit number for each core 110, 120, 130 to which it is configured to assign tasks. The credit numbers typically will all be initialised with the same value (for example, a value of zero), however, the magnitude of the initial value is unimportant and can be of an arbitrary size. The master unit 140 can be configured to, on assigning a task to a core, adjust the credit number of that core by a first amount (for example, by incrementing by one). Each of the slave units 111, 121, 131 can be configured to send a credit notification to the master unit 140 when its core completes an image rendering task. The credit notification can include information that identifies the slave unit that sent it, such that the master unit 140 knows which core has completed a task. On receiving a credit notification, the master unit 140 can be configured to adjust the credit number of the core that sent the credit notification by a second amount (for example, by decrementing by one). By adjusting the credit number of a core in one direction by a set amount for each task assigned to that core, and by adjusting the credit number of a core in the opposite direction for each credit notification sent by the slave unit of that core, the master unit 140 maintains a running count of how many uncompleted tasks each core has assigned to it. The credit number is a representation of how busy a core is (with work assigned by the particular master unit), and a difference between credit numbers for two or more cores is an indication that one core is less busy than another (with that type of work). By storing and maintaining credit numbers for the cores, the master unit 140 keeps track of how busy each core is throughout the image rendering process, enabling the master unit to load balance the cores. This will be explained in more detail with reference to FIG. 4 and for the exemplary GPU 100 of FIG. 1 (although a corresponding method applies for other GPUs, such as the GPU 300 of FIG. 3).

As with the method 200 of FIG. 2, in step 210 the master unit 140 of the third core 130 receives a set of image rendering tasks. Before the master unit 140 assigns tasks to the cores, it first stores 400 a credit number for each available core. An available core is a core that is currently configured to process the image rendering tasks. In the present example, the first and second cores 110, 120 are the available cores. The master unit 140 then assigns 220 a first subset of the set of image rendering tasks to the first core 110 and adjusts 410 the credit number of the first core 110 by the first amount for each task assigned to the first core 110 (for each task in the first subset). At step 240 the master unit 140 transmits the first subset to the slave unit 111 of the first core 110. Similarly, the master unit 140 assigns 230 a second subset of the set of image rendering tasks to the second core 120 and adjusts 420 the credit number of the second core 120 by the first amount for each task in the second subset. The master unit 140 then transmits 250 the second subset to the slave unit 121 of the second core.

After the first core 110 processes a task in the first subset, the slave unit 111 of the first core transmits 430 a first credit notification to the master unit 140. The master unit 140 adjusts 450 the credit number of the first core 110 by the second amount on receiving the first credit notification. Similarly, after the second core 120 processes a task in the second subset, the slave unit 121 transmits 440 a second credit notification to the master unit 140, and the master unit 140 adjusts 460 the credit number of the second core 120 by the second amount on receiving the second credit notification. The slave unit 111 of the first core transmits 430 a first credit notification each time the first core 110 completes a task, and the slave unit 121 of the second core 120 transmits 440 a second credit notification each time the second core 120 completes a task. Where the third core 130 has also been assigned tasks, the slave unit 131 of the third core 130 can transmit a third credit notification when the third core 130 processes a task, and the master unit 140 can adjust the credit number of the third core 130 by the second amount on receipt of the third credit notification.

Figure 5:
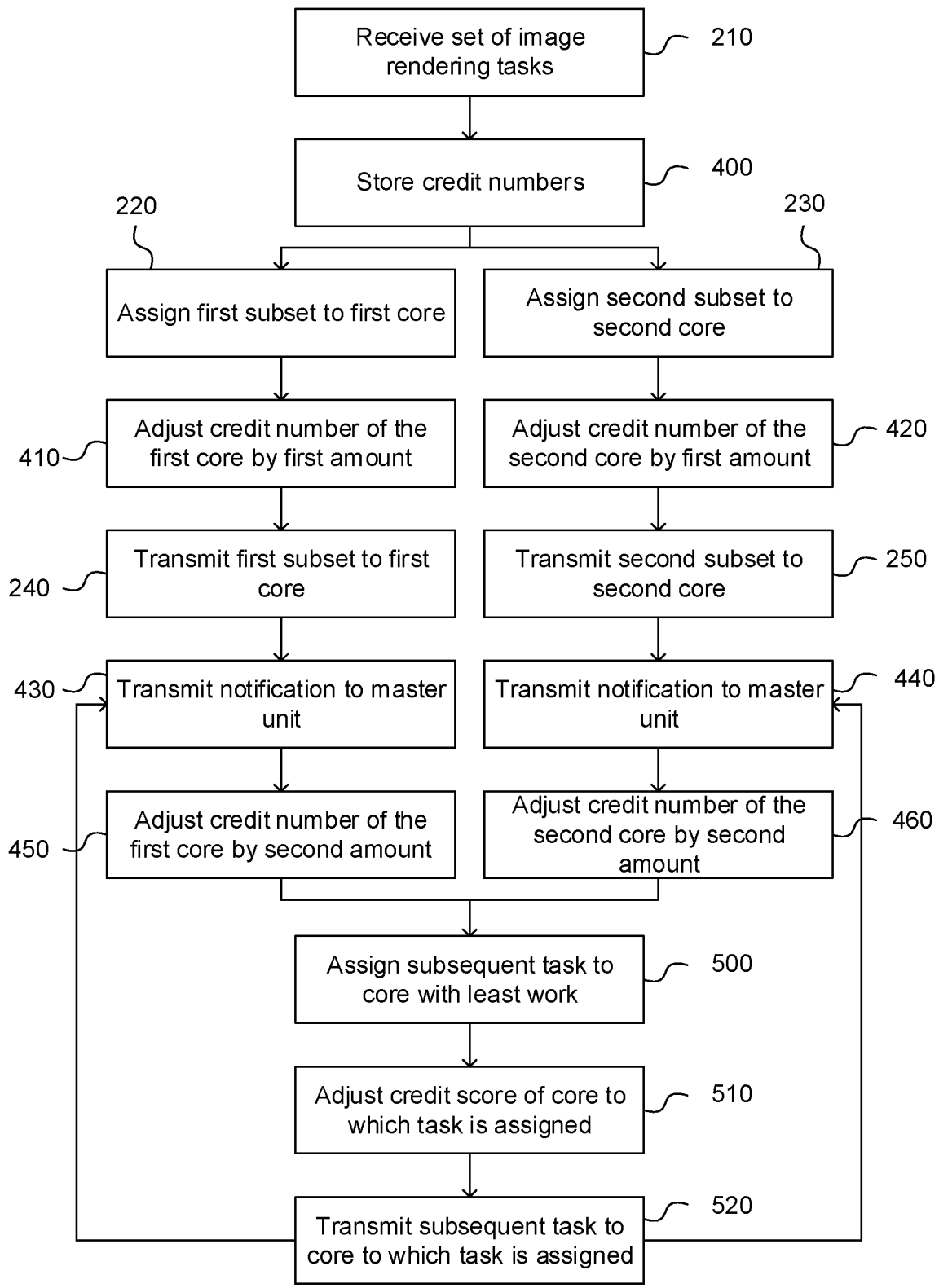
FIG. 5 is a flowchart illustrating a method according to an example.

As depicted in FIG. 5, after the master unit 140 has adjusted the credit number of one of the cores in response to a credit notification, the master unit 140 can assign 500 a subsequent image rendering task or tasks to the least busy core (as indicated by the credit number for each available core). In step 510, the master unit 140 adjusts the credit number of the core that has been assigned the subsequent task by the first amount, and in step 520 transmits the task to the core to which it has been assigned. By assigning additional tasks to the least busy core, that core is prevented from becoming idle. This helps to reduce skew, maintaining the parallel processing of the image rendering tasks. By adjusting the credit number of the core to which the additional task has been assigned, the master unit 140 ensures that the credit numbers remain up-to-date and a true reflection of how busy each core is.

The method can loop, as is depicted in FIG. 5. By looping the method, the load balancing of the cores is continually maintained, ensuring a maximum degree of parallelisation for as long as possible. It should be noted that each slave unit 111, 121, 131 is able to buffer a finite number of image rendering tasks. This is the maximum number of tasks that can be assigned to the core by the master unit 140 at any one time. In practice, rendering an image typically involves a number of image rendering tasks orders of magnitude greater than the buffer size of each core. By continually load balancing the cores as they work through the image rendering tasks, the cores can process tasks in parallel for at least the majority of the image rendering tasks.

Although FIG. 5 presents the assignment of subsequent tasks as occurring after the master unit receives one or more notifications of a slave unit completing a task subset, it will be understood that this is not a requirement for the allocation of subsequent tasks. For example, if the master unit knows (e.g. based on the credit numbers for the various slave units) that a slave unit has more capacity than the work currently available to distribute, it may immediately distribute newly received work to that slave unit, irrespective of whether that slave unit has completed the previously allocated work. In other words, the distribution of work is a function of the work available to distribute, as well as the capacity of the slave units.

When assigning 220, 230 the first and second subsets to the first and second cores 110, 120, the master unit 140 can chose the size of the first and second subsets (the number of tasks contained in each subset) such that they completely fill the buffers of the slave units 111, 121. In this way, the credit number of the first and second cores 110, 120 after the first and second subsets have been assigned can represent the cores at their most busy. Any credit number indicating that one of the cores is less busy than this initial state means that the core has capacity to accept additional tasks. If the credit number of a core is at the initial value then it is at maximum capacity and the master unit will not assign it any additional work.

The first amount and the second amounts can have any magnitude but have opposite signs, such that changing a credit number by one of the first and second amounts increases the credit number, while changing the credit number by the other one of the first and second amounts decreases the credit number. The magnitudes of the amounts are unimportant because it is the difference between the credit numbers that indicates to the master unit 140 which core is busier, not the magnitude of the number itself. In some examples, the first amount is positive and the second amount is negative. In such examples, the more positive the credit number of a core is, the more pending tasks it has been assigned and the busier it is. Where the first amount is instead negative and the second amount is positive, the more negative the credit number of a core is, the busier it is. In some examples, the first and second amounts have the same magnitude.

When determining which core is the least busy in order to load balance the cores, the master unit 140 can compare credit numbers and identify the core with the least positive (or least negative, depending on the signs of the first and second amounts) credit number as the least busy core.

One factor that is useful to consider when mitigating skew is the capacity of each core to process tasks. Within a core, the slave unit may be responsible for distributing the tasks assigned to that core to PUs 199 within the core. The PUs 199 may process the image rendering tasks. In some examples, each core of the GPU may be identical. That is, all cores may have the same number of master units (considered in further detail below), slave units and PUs, and each master unit and slave unit in a core has an identical counterpart unit in each of the other cores. However, this is not necessarily the case. In some examples, the cores can differ (for example, in that the cores may have different numbers of master units, slave units and/or PUs). Where two cores have a different number of PUs 199, they have a different ability to process tasks. For example, all else being equal, a core with two PUs 199 can process twice the number of tasks at one time as a core with only a single PU 199.

Even where cores are identical in physical structure, they can nonetheless be configured to have different processing capacities. For example, cores can be partitioned—half of the PUs 199 of a core may be reserved for geometry processing tasks while the other half are reserved for compute processing tasks. Such a core has half the effective processing power for geometry processing compared to a non-partitioned core with the same total number of PUs 199. The number of PUs 199 in a core available to perform a specific type of image rendering task is referred to as the number of available PUs 199 in that core.

Each core can send information about its number of available PUs 199 to the master unit 140. When assigning 220, 230, 500 tasks to the cores, the master unit can take into account any differences between the number of available PUs 199 in each core, assigning tasks to the cores in direct relation to the number of available PUs 199 in each core. In other words, the master unit 140 can consider both the credit number of each core (indicating how busy that core is) and the number of available PUs 199 that core has (its overall capacity to complete tasks). For example, where the first core 110 has two available PUs 199 and the second core 120 has four available PUs 199, the master unit 140 could initially assign twice as many tasks to the second core 120 as the first core 110 (filling both cores to maximum capacity), and treat the credit number of the first core 110 as indicating twice the number of unprocessed tasks as the core 110 actually has. In this way, the master unit 140 accounts for the difference in processing capabilities between each core by weighting the credit number of the first core 110, better balancing the cores and reducing skew. Alternatively, the master unit 140 may initially assign the same number of tasks to each core as mentioned above based on the buffer size of the slave units. While this would, initially, mean that the workload of each core was not proportional with its processing capability, over the course of the image processing the load balancing could compensate for this to reduce/eliminate skew.

Weighting is not the only way that the master unit 140 can take into account differing numbers of PUs 199 in the cores. For example, the master unit 140 may be biased to assign work to the core with more available PUs 199, such that when two cores with different numbers of PUs 199 have the same credit number, the master unit 140 preferentially assigns tasks to the core with the larger number of available PUs 199.

One complicating factor that may require consideration when processing tasks in parallel is task-dependency. Some tasks (referred to herein as dependent tasks) depend on the completion of earlier tasks (referred to herein as first tasks). A "first task" is a task on which another task depends. One example of task dependency is a dependent task that requires the output of a first task as an input. If the dependent task is processed before the first task is processed, it will not process correctly and the final image will contain errors. Typically, the master unit 140 is provided a set of tasks in the order that the application intends them to be processed, such that a first task is always processed before its dependent task. This is because image rendering applications may be unaware of the fact that they are running on multi-core GPUs, and so provide a single control stream suitable for processing by a single core.

When splitting tasks between cores, it is possible that a dependent task will be sent to a core for processing and be processed before the task on which it depends has been processed. To preserve the integrity of the final image, this must be prevented from happening. One solution is to ensure that a first task and its dependent task are always assigned to the same core in the required order, such that the core always processes the first task before the second task. However, this solution restricts the degree to which tasks can be processed in parallel, and can impact the performance of the GPU. This is particularly true where a dependent task depends on multiple first tasks. These first tasks would ideally be processed in parallel, drastically reducing overall processing time, but the above mentioned solution would forbid this and would instead require all of the tasks to be processed on a single core.

A solution that enables a higher degree of parallelisation to be maintained is explained with reference to FIG. 6, and makes use of a task completion update command. A task completion update command is a command that, when processed by a core, causes the slave unit of that core to transmit a task completion update to the master unit 140. One example of a task completion update command is a work fence command. When a core processes a work fence command, it causes the slave unit of that core to transmit a fence update to the master unit that assigned the core the work fence command.

In the present example, a task completion update and a credit notification differ in that a credit notification simply indicates that a task has been processed by a core, whereas a task completion update indicates specifically that a task completion update command has been processed. In some examples, the credit notifications can also serve the purpose of the task completion updates. For example, the credit notifications may include an indication of which task has been completed. Alternatively, the master unit 140 may determine, based on the credit number of the core at the time that the master unit assigned a particular task to that core, that after a specific number of credits have been received from the core the particular task has been processed. For example, if the master unit 140 assigns a task to the second core 120 when the second core already has a credit number of nine, then the master unit 140 can determine that once it has received ten credit notifications from the second core the task has been processed.

Figure 6:
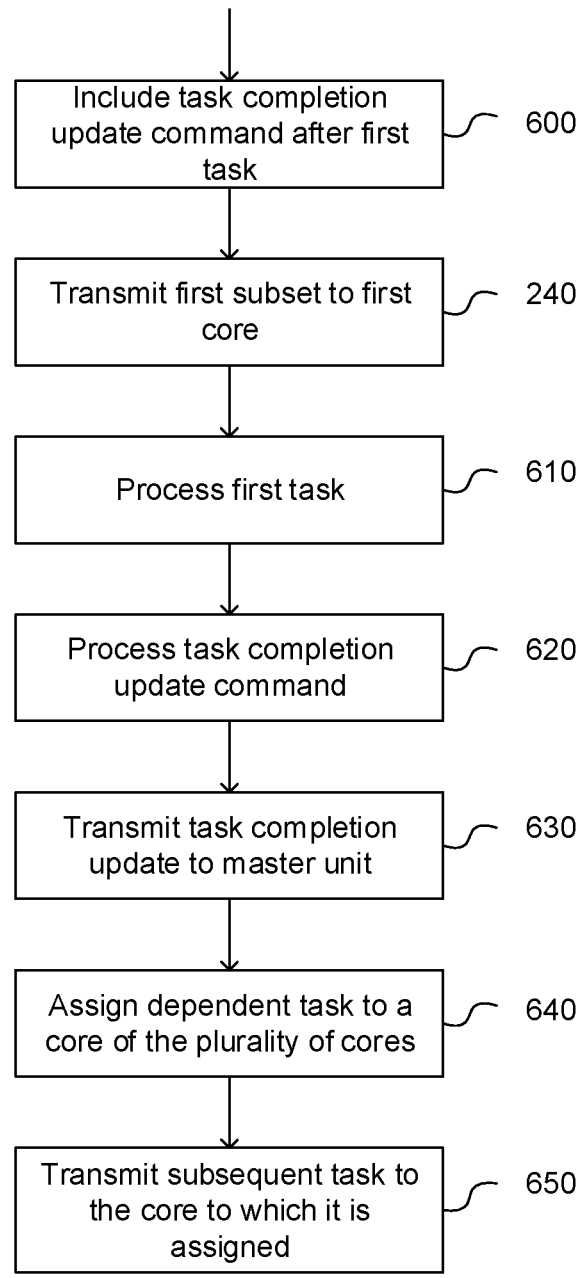
FIG. 6 is a flow chart illustrating a method according to an example.

FIG. 6 is a flow diagram depicting an exemplary method by which the GPU 100 of FIG. 1 can utilise a task completion update command. The initial steps of receiving 210 the tasks and assigning 220, 230 the subsets are not shown, for conciseness, but are performed as is depicted in FIG. 2. At step 600, which follows immediately from step 220 and precedes step 240, the master unit 140 includes a task completion update command after a first task in the first subset (preferably immediately after the first task). The first subset, including the task completion update command, is then transmitted 240 to the slave unit 111 of the first core 110. After the first core 110 has processed 610 the first task, it processes 620 the task completion update command. On processing 620 the command, the slave unit 111 transmits 630 a task completion update to the master unit 140. This update informs the master unit 140 that the first task has been processed by the first core 110. The master unit 140 is then able to assign the dependent task to any core without any risk that the dependent task will be processed before the first task. For example, the master unit 140 can assign 640 and transmit 650 the dependent task to the second core 120. Preferably, the master unit 140 will assign the dependent task to the core with the least work as is indicated by the credit numbers, as explained above, in order to continue to load balance the cores.

This method allows tasks to be processed in parallel without the risk that a dependent task is processed before the task from which it depends. Where the first or second subsets contain dependent tasks, the master unit 140 can refrain from transmitting these tasks to the cores until the master unit 140 receives the task completion updates for the first tasks from which the dependent tasks depend. Dependent tasks may themselves be first tasks for other dependent tasks, and can accordingly be accompanied by a task completion update command.

Figure 7:
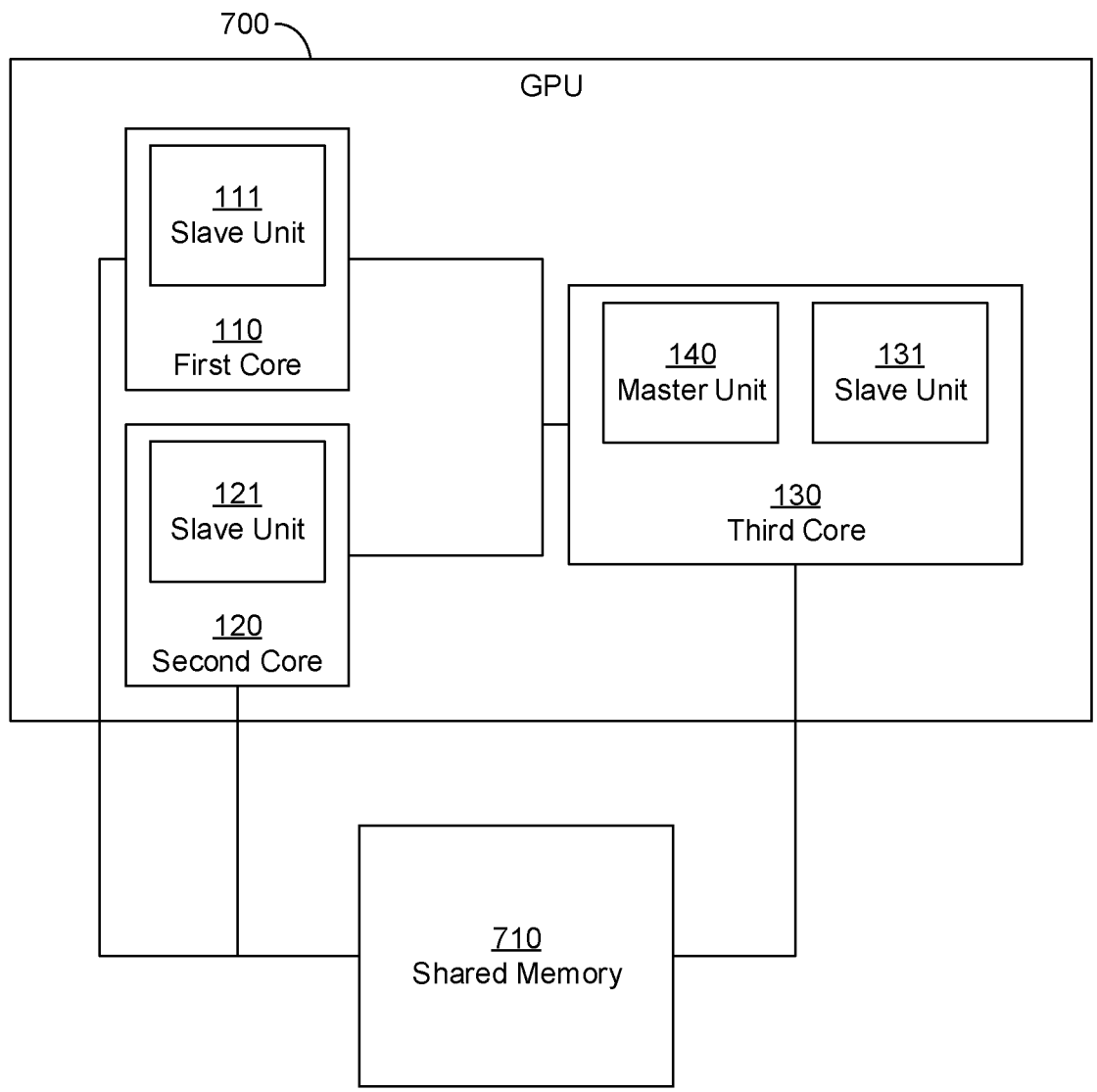
FIG. 7 is a block diagram of a GPU according to an example.
Figure 8:
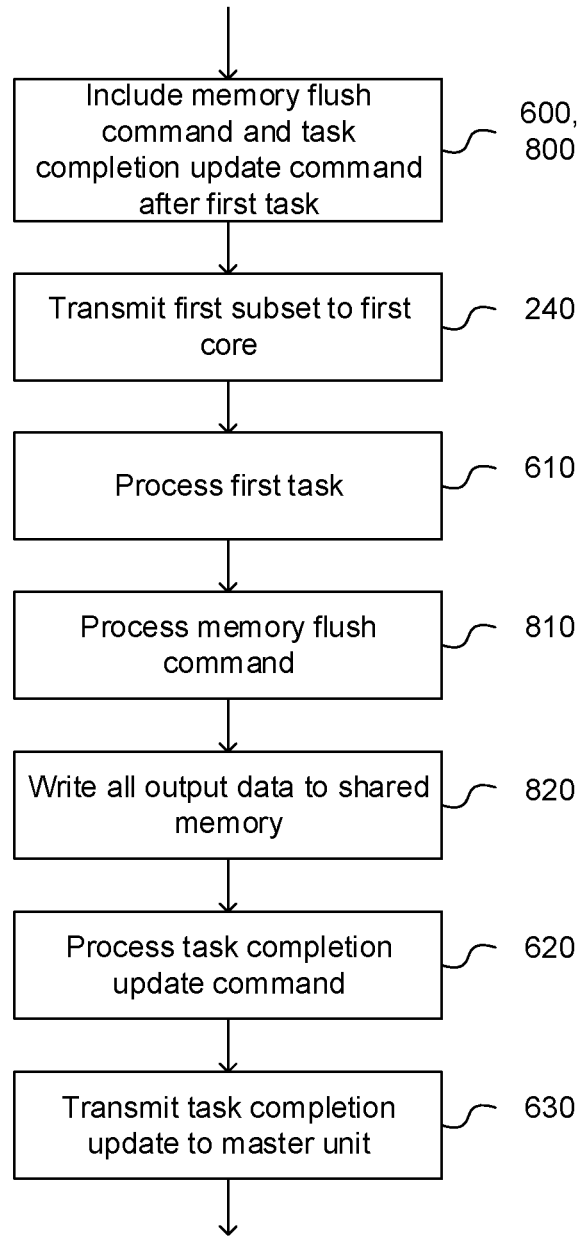
FIG. 8 is a flowchart illustrating a method according to an example.

In some examples, when a core processes a task, it stores the resultant data (the output of the task) in a local memory (e.g. a cache) that is accessible only by that core (and may be located within the core). The core can periodically write this data to a shared memory accessible by all cores. However, this can lead to another dependency issue—where a dependent task's first tasks have all been processed, that processed data may be stored within local memories that are inaccessible to the core processing the dependent task. If this happens, then at least a part of the input data for the dependent task is unobtainable and the dependent task will not be properly processed. For example, if the first core 110 has not yet written the output of the first task to a shared memory accessible to all cores, the second core 120 will not be able to properly process the dependent task even though the first task has been processed. To address this issue, a memory flush command can be used in addition to the task completion update command. When processed by a core, the memory flush command causes the core to write all data stored in local memory to a shared memory, accessible by all of the cores. An exemplary GPU 700 comprising a shared memory 710 is depicted in FIG. 7. An exemplary method making use of the memory flush command is explained below with reference to FIG. 8. As with FIG. 6, steps 210-230 have not been shown the flow diagram, but are present in the method. Additionally, steps 640 and 650 have not been shown (but are still present in the method).

In addition to including 600 a task completion update command after a first task, the master unit 140 can include 800 a memory flush command after the first task (and preferably before the task completion update command). When the first core 110 processes 810 the memory flush command (after processing 610 the first task), it writes 820 all of the output data stored in the local memory (not shown) of the first core 110 to the shared memory 710. With the output data written to the shared memory 710, it accessible to all of the other cores, any of which can then process the dependent task.

It is preferable to include the memory flush command before the task completion update command because then the task completion update transmitted by the slave unit 111 serves to notify the master unit 140 both that the first task has been processed, and that the output data of the first task is available in the shared memory 710.

Another useful type of command that can be transmitted with the subsets is a cache flush invalidate (CFI) command. A CFI command may be broadcast to all cores in the GPU. More specifically, a master unit may send a CFI to all of the cores to which it has assigned work. Like a memory flush command, the CFI command causes any core that processes it to write all stored data within the core to shared memory 710. Typically, CFI commands are used when the set of tasks received by the master unit 140 have all been processed. In other words, the master unit 140 can broadcast a CFI command when it has no further tasks to assign the cores from the set of tasks. This readies the cores to receive new tasks from a new set of tasks. The CFI is useful because it stops an external process (such as GPU firmware or software running on an external host) from having to instruct the cores to flush their memories, which is slower and increases idle time between the GPU finishing one workload and being issued another, reducing performance. After a core performs a CFI, the slave unit of the core may transmit a CFI notification to the master unit, informing it that the CFI has been completed. In some examples, the slave units 111, 121, 131 can be configured to automatically perform a CFI and send the CFI notification. For example, a slave unit can be configured to perform a CFI when its core has no further tasks to process.

Up to this point, the multi-core system has been described as comprising only a single master unit. However, this is not necessarily the case. In some examples, each core can comprise a master unit in addition to a slave unit, or multiple master and slave units. In any of the examples provided above, each core could comprise a master unit and a slave unit, although only one master unit might be active.

Figure 9:
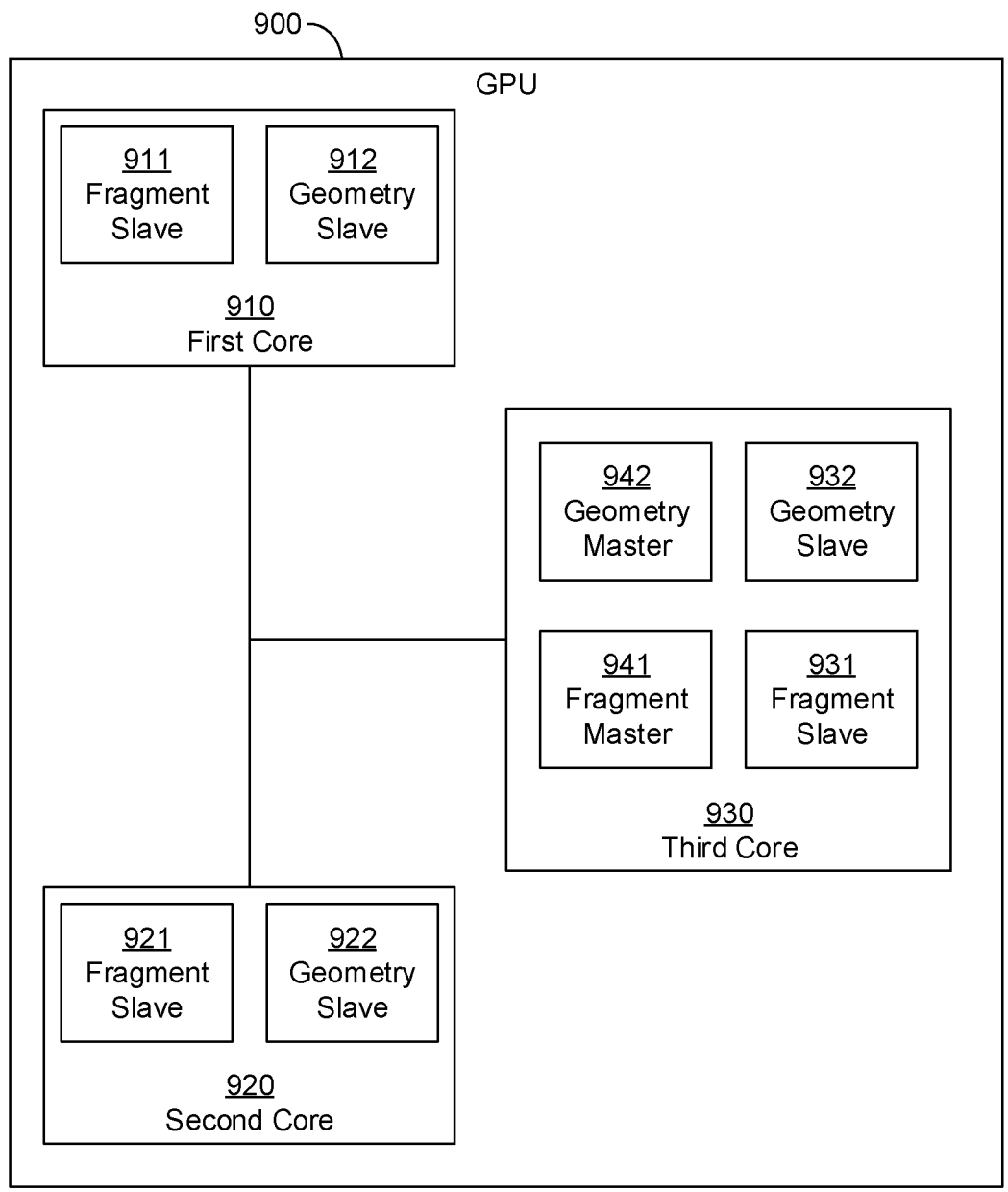
FIG. 9 is a block diagram of a GPU according to an example.

As has been mentioned above, image rendering tasks can comprise a plurality of different types of task such as fragment, geometry and compute tasks, and for each type of task a GPU may comprise dedicated hardware for performing that particular type of task. Typically, a set of tasks provided to the GPU will comprise only one of these types of tasks. The management of these tasks can be segregated, such that one master unit and one set of slave units only interact with one type of task, at least at any given time. Consequently, parallel processing two types of task, and load balancing the cores for each type, may require at least two active master units in the multi-core system and at least two slave units per core. A master unit configured to only receive, assign and transmit geometry tasks may be referred to as a geometry master unit, and its slave units as geometry slave units. A master unit and slave units configured in the same way but for fragment processing tasks may be referred to as fragment master and slave units. FIG. 9 depicts one example of a GPU 900 comprising geometry and fragment master and slave units.

In the GPU 900, the third core 930 comprises a fragment master unit 941 and a fragment slave unit 931, as well as a geometry master unit 942 and a geometry slave unit 932. The first and second cores 910, 920 each comprise a fragment slave unit 911, 921 and a geometry slave unit 912 and 922. In some examples, the first and second cores 910, 920 can also each comprise fragment and geometry master units, making the three cores identical, however for simplicity we will consider only the example in which the third core 930 comprises master units.

As explained above, the fragment master unit 941 is configured to receive fragment processing tasks, while the geometry master unit 942 is configured to receive geometry processing tasks. The multi-core GPU 900 can execute any of the methods described above. The fragment master and slave units can perform any of the above methods at the same time as, but independently of the geometry master and slave units. For example, the fragment master unit 941 can maintain credit numbers for the cores, while at the same time the geometry master unit 942 also maintains credit numbers for the cores, independently of the fragment master. More particularly, the fragment master unit 941 can maintain a credit number for each of the fragment slave units 911, 921, 931 of the cores that it has assigned work to, and the geometry master unit 942 can maintain a credit number for each of the geometry slave units 912, 922, 932 of the cores that it has assigned work to. When the fragment master unit 941 assigns a fragment processing task to a core, it can adjust the credit number for that core by the first amount, as described in reference to FIGS. 4 and/or 5. However, the geometry master unit 942 will only adjust its credit number for a core in response to that core being assigned geometry processing tasks, and in response to the core notifying it that one of those tasks has been completed. The same is true, correspondingly, for the fragment master unit 941, which only adjusts its credit number in response to the assignment of fragment tasks. In this way, two distinct credit numbers can be maintained for each core. One credit number relates only to how busy the core is with fragment processing tasks, and the other relates only to how busy the core is with geometry processing tasks. By independently load balancing each core as has been described above, the master units 941, 942 can both help to reduce skew between the cores. It is particularly preferable that both/all active master units carry out load balancing because this enables contention within cores to be compensated for. For example, if the first core 910 is assigned a set of high priority fragment processing tasks, this may delay the processing of any geometry processing tasks assigned to the first core 910, and the geometry credit number for the first core 910 will remain high. This means that the master unit 942 will not assign additional geometry processing tasks to the first core 910, which would simply lead to a growing backlog of tasks that could cause skew. While the master and slave units have been described above as geometry and fragment units, they can instead be configured to handle other types of tasks. Most generally, they can simply be described as first and second master/slave units configured to handle first/second types of tasks.

In some examples, the multiple active master units can collaboratively load balance. The master units may maintain a shared credit number for each core that represents the total number of tasks of all types currently assigned to that core. Using the same load balancing principle of assigning additional tasks to the least busy core, skew between the cores can again be prevented. In some examples a single master unit can receive heterogeneous set of tasks (a set containing a mix of task types), and can split these tasks between the cores, maintaining a single credit number for each core as described above.

Although in the example of FIG. 9 the third core 930 comprises both of the active master units, this is not necessarily the case. For example, the first core 910 could comprise one active master unit while the third core comprises the other. In some examples, the first core may comprise all active master units. In some examples, there may be no third core 930 and the GPU may comprise only two cores. Preferably, each core comprises the same number of master units as slave units, and each core is identical in that each master unit and each slave unit in a core has an identical counterpart in each of the other cores. This also applies where only one active master unit is present in the multi-core system, such as the example of FIG. 1 or FIG. 3. By making the cores identical, even though that can result in redundancy due to inactive master units, the cores are able to operate both in parallel as described above, and independently, with at least one master unit in each core being active and providing work to a corresponding slave unit of that core. Moreover, using identical cores containing both master and slave units makes the GPU architecture more easily scalable—that is, it becomes simpler to design larger (or smaller) GPUs by adding (or removing) cores without disrupting the overall layout, and designs with different numbers of cores become easier to verify for correctness because there are fewer different units overall. Due to the relatively small on-chip size of the master units, inclusion of inactive master units does not use up a significant amount of chip space, and also provides redundancy should a master unit in another core develop a fault.

In some examples, a register bus 101 links the cores. The primary function of the register bus 101 is to communicate essential register information between the cores, setting configuration registers using register write commands and accessing register information using register read commands. However, the register bus 101 can also be exploited to allow communication between a master unit and its slave units—for example, allowing the master unit 140 to transmit tasks to slave units 111, 121, and allowing the slave units 111, 121 to transmit credit notifications and task completion updates to the master unit 140. Using the register bus 101 in this way eliminates the need for dedicated connections between the cores, saving chip space. It is possible to utilise the register bus 101 for master-slave communications due to the small size of those communications. For example, when the master unit 140 transmits a subset of tasks to a core, rather than encoding all of the information needed to process the tasks in a register write command, the master unit 140 can instead simply provide the slave unit enough information to find the necessary information. An example of this would be transmitting to the slave unit the address in memory of the data to be processed.

Figure 10:
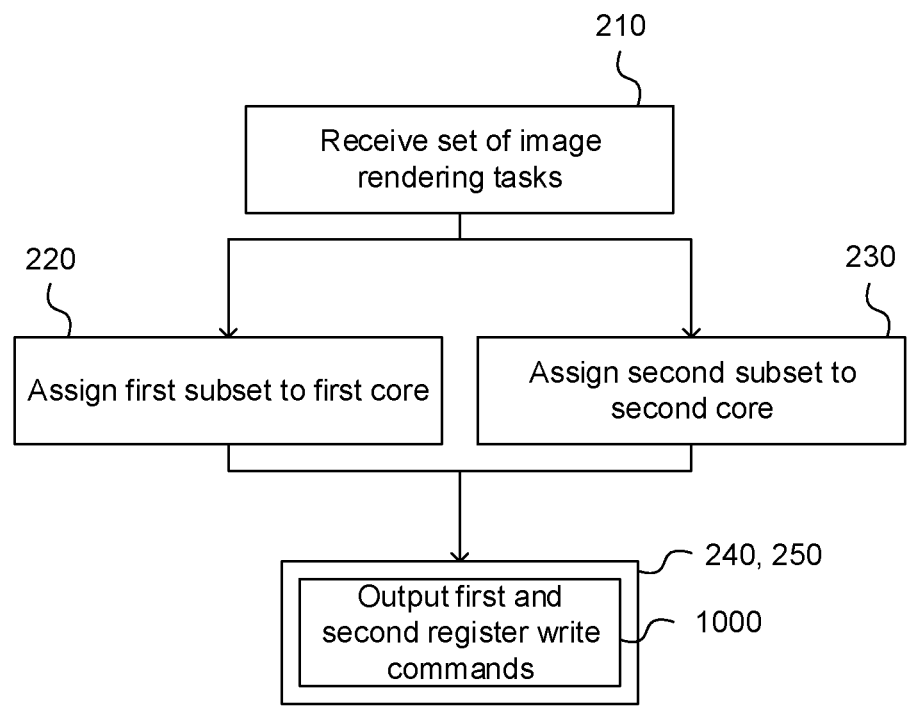
FIG. 10 is a flowchart illustrating a method according to an example.

In order to utilise the register bus 101 for master-slave communications, the transmitting 240, 250 of first and second subsets by the master unit can comprise outputting (step 1000) first and second register write commands, wherein the first register write command comprises an indication of the first subset of tasks and the second register write command comprises an indication of the second subset of tasks (see FIG. 10). The master unit may further output subsequent register write commands comprising indications of subsequently assigned tasks. Outputting 1000 can comprise transmitting the register write commands to slave units directly via the register bus 101, or outputting the commands to other hardware units in the third core 130 for transmission.

The master unit 140 can address a register write command to the core to which it has assigned the subset of tasks contained in the write command. In other words, the master unit 140 can output a first register write command addressed to the first core and comprising an indication of the first subset of tasks, and a second register write command addressed to the second core and comprising an indication of the second subset of tasks. Depending on the number of tasks in each subset, more than one register write command may be required to transmit a subset. In some cases, such as the transmission of a subsequent task, a register write command may include an indication of only a single task. In any case, each register write command is transmitted over the register bus 101 and received by the core to which it is addressed. Instead of writing data in the command to the register as would normally occur, the cores 110, 120 can instead pass the data to the slave units 111, 121. Where each core comprises multiple slave units, a register write command can be addressed to a specific slave unit in a specific core, and the receiving core can pass the data contained within the command to the slave unit to which it is addressed. In this way, the separation of first and second types of tasks in first and second master and slave units (as described above) can be maintained.

Where the slave units of the cores are configured to transmit credit notifications, task completion updates and/or CFI notifications, these can be in the form of register write commands or register read commands, addressed to the active master unit. Where there are multiple active master units, each slave unit can transmit the communications to the master unit from which it received the task. Similarly, the master unit can address communications to a specific slave unit within a specific core.

When exploiting the register bus 101 to carry master-slave communications, it can be useful to reserve a range of register addresses for the master-slave communications. A reserved register address is a register address that the cores have been configured not to use for conventional register read/write commands (commands intended to actually access a register). Thus, when a core receives a register read/write command addressed to the reserved register address, instead of simply reading/writing data from/to a register it can determine that this is a master-slave communication and will pass the data to the master or slave unit of the core. Each core can be associated with at least one reserved register addresses, such that an address indicates both which core (and optionally which slave unit in that core) the communication is addressed to, and that it is a master slave communication and not a normal register read or write command. If a register read/write command does not use a reserved register address then the core can treat it as a conventional register read/write command, and read/write data from/to the register. Communications sent from the slave units, such as credit notifications and task completion updates, may also be addressed to reserved register addresses, and the third core 130 may only send these communications to the master unit 140 if they are addressed to a reserved register address. By the slaves units addressing credit notifications and/or task completion updates to different reserved register addresses, the master unit 140 can tell which core (and which slave unit in that core) sent the credit notification and/or task completion update.

Figure 11:
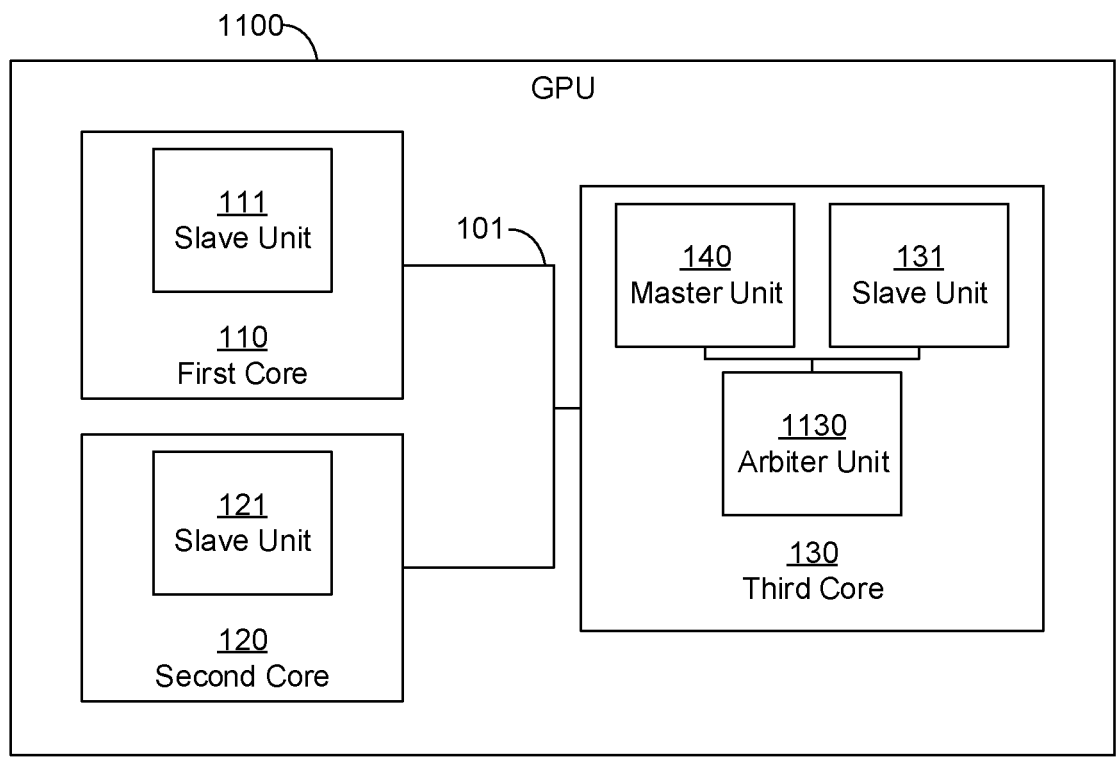
FIG. 11 is a block diagram of a GPU according to an example.
Figure 12:
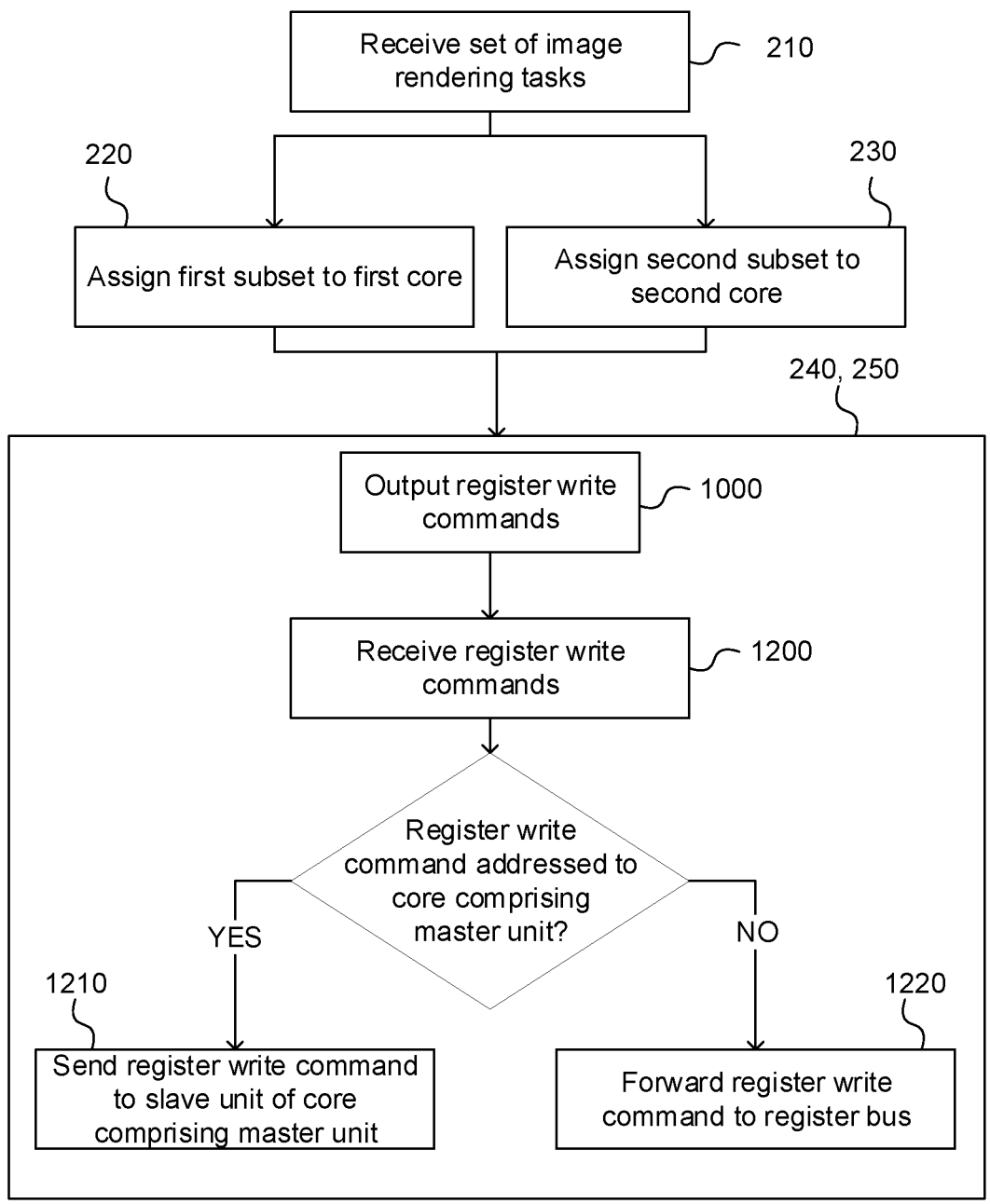
FIG. 12 is a flowchart illustrating a method according to an example.

In some examples, the core comprising the active master unit (or each core comprising an active master unit) can comprise an arbiter unit. An example of this is depicted in FIG. 11, in which the third core 130 of the GPU 1100 comprises the active master unit 140 and an arbiter unit 1130 in communication with the master unit 140 and slave unit 131. An exemplary method performed by the GPU 1100 is depicted in FIG. 12. The arbiter unit 1130 can receive 1200 the register write commands output 1000 by the master unit 140 and, if the write command is addressed to the slave unit 131 of the core containing the master unit (in this example, the third core 130), send 1210 the write command (or data contained therein) to the slave unit 131 of the core containing the master unit. If a register write command is not addressed to a slave unit in the core comprising the master unit, the arbiter unit 1130 can forward 1220 the write command to the register bus 101 for transmission to the core to which the command is addressed. This can mean forwarding the command directly to the register bus 101, or forwarding it to the register bus 101 indirectly via another unit in the core containing the master unit.

Where a core comprises multiple master units and/or multiple slave units, its arbiter unit can be in communication with each of these master and slave units. For example, if the third core 930 of GPU 900 of FIG. 9 comprises an arbiter unit, it can receive register write commands from both master units 941, 942 and send any command (or data contained therein) to the appropriate slave unit within the core 930, or forward the command to the register bus 101 where it is not addressed to either slave unit of the third core 930.

Similarly, the first and second cores 110, 120 (and more generally, the cores not comprising an active master unit) can each comprise an arbiter unit, which can receive register write commands sent by the core with the active master unit. In each core, the arbiter unit can send the received register write command (or the data contained in it) to the slave unit to which the write command is addressed. Where the slave units are configured to transmit a credit notification, a task completion update or a CFI notification, this communication (optionally in the form of a register read/write command) can be output to the arbiter unit of the core. The arbiter unit can forward the command to the register bus 101 for transmission to the relevant active master unit, or can send the read/write command directly to the relevant active master unit if that unit is in the same core as the arbiter unit. Where the arbiter unit forwards the read/write command to the register bus 101, it may forward the command directly to the register bus 101, or indirectly to the register bus 101 via another unit in the core. Alternatively, the slave unit can transmit the communication directly over the register bus 101.

The arbiter unit 1130 of the core comprising the active master unit can be configured to receive register read/write commands transmitted by the slave units of the cores, and send the commands to the active master unit.

Figure 13:
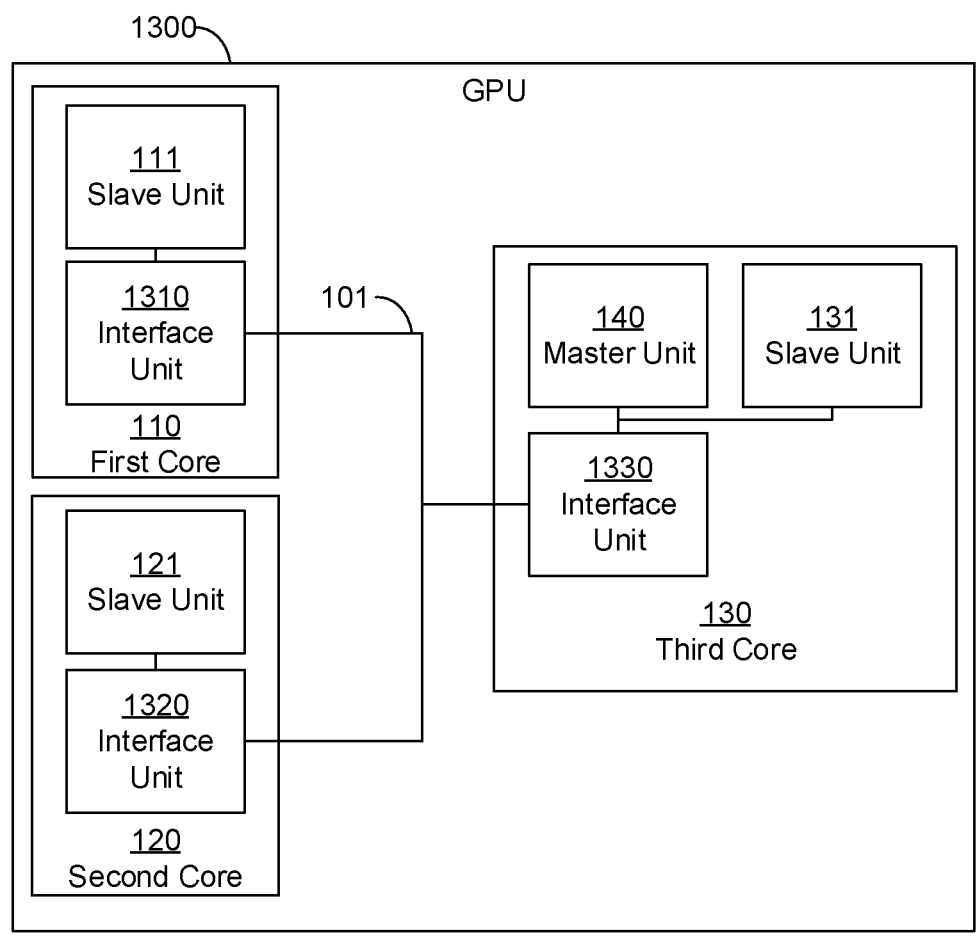
FIG. 13 is a block diagram of a GPU according to an example.

As depicted in FIG. 13, the first, second and third cores 110, 120, 130 of the GPU 1300 can each comprise an interface unit 1310, 1320, 1330. Each interface unit connects to the register bus 101, and can be in communication with the master and slave units of its core. The interface units are configured to receive register read/write commands from hardware units within a core, and transmit those commands over the register bus 101. Similarly, they are further configured to receive register read/write commands from the register bus 101 and forward them to master or slave units within the core. An exemplary method performed by the GPU 1300 will be explained with reference to FIG. 14A.

The initial stages (210-230) of the method are the same as those explained for FIG. 2. The interface unit 1330 of the third core 130 can receive 1400 the register write commands output 1000 by the master unit 140 and transmit 1410 the first command to the first core 110 and the second command to the second core 130. The interface unit 1310 of the first core 110 receives 1420 the first register write command and the interface unit 1320 of the second core 120 receives 1430 the second register write command. The interface unit 1310 of the first core 110 forwards 1440 the first register write command to the slave unit 111, and the interface unit 1320 of the second core 120 forwards 1450 the second register write command to the slave unit 121. Forwarding to a slave unit can mean sending directly to the slave unit, or indirectly via another hardware unit, for example via the arbiter unit.

Figure 14A:
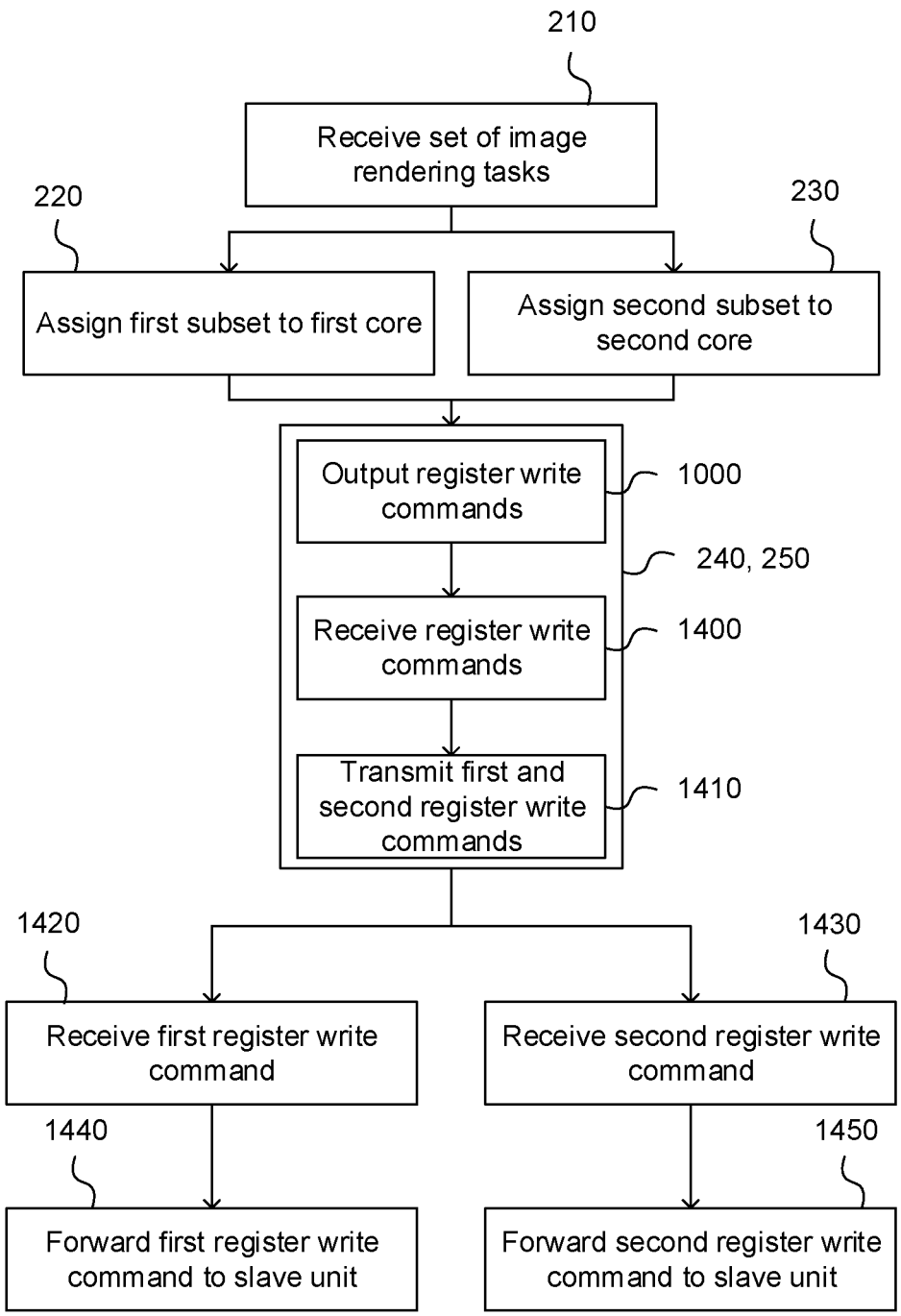
FIG. 14A is a flowchart illustrating a method according to an example.
Figure 14B:
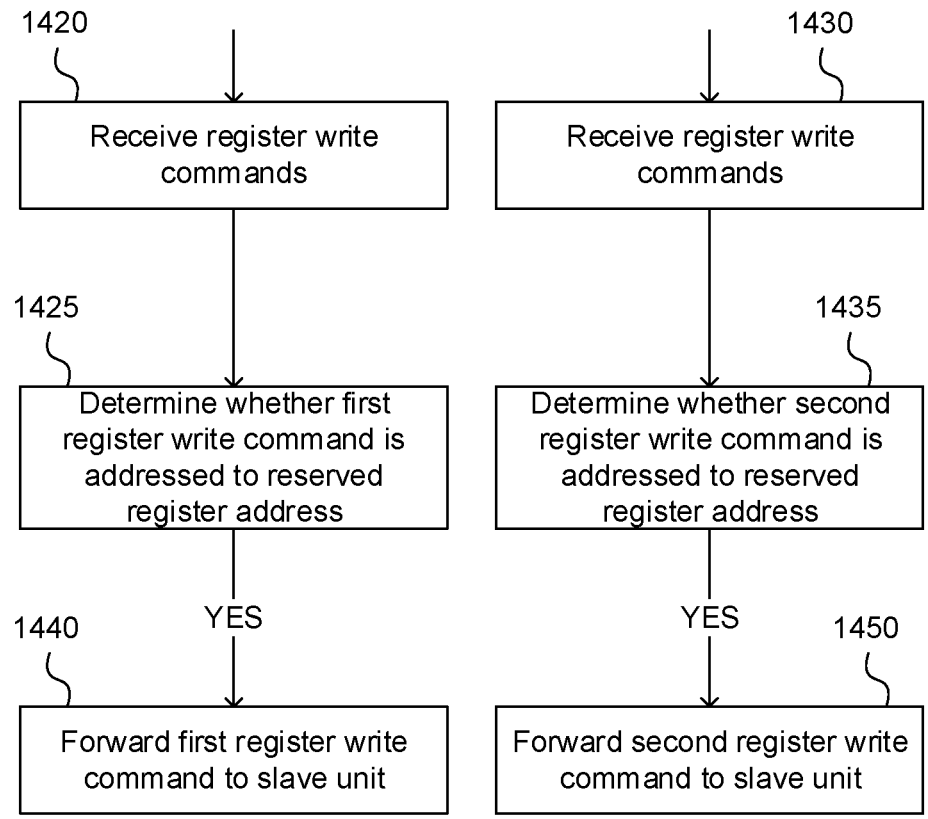
FIG. 14B is a flowchart illustrating a method according to an example.

The interface units 1310, 1320 can each, on receiving a register write command, determine 1425, 1435 whether the register write command is addressed to a reserved register address or to an unreserved register address (see FIG. 14B). If the register write command is addressed to a reserved register address then the interface unit can recognise that this is a master-slave communication, and forward 1440, 1450 the register write command to the slave unit of the core. Otherwise, the interface units will treat the register write command as a conventional command to write data to a register in the core.

Figure 15:
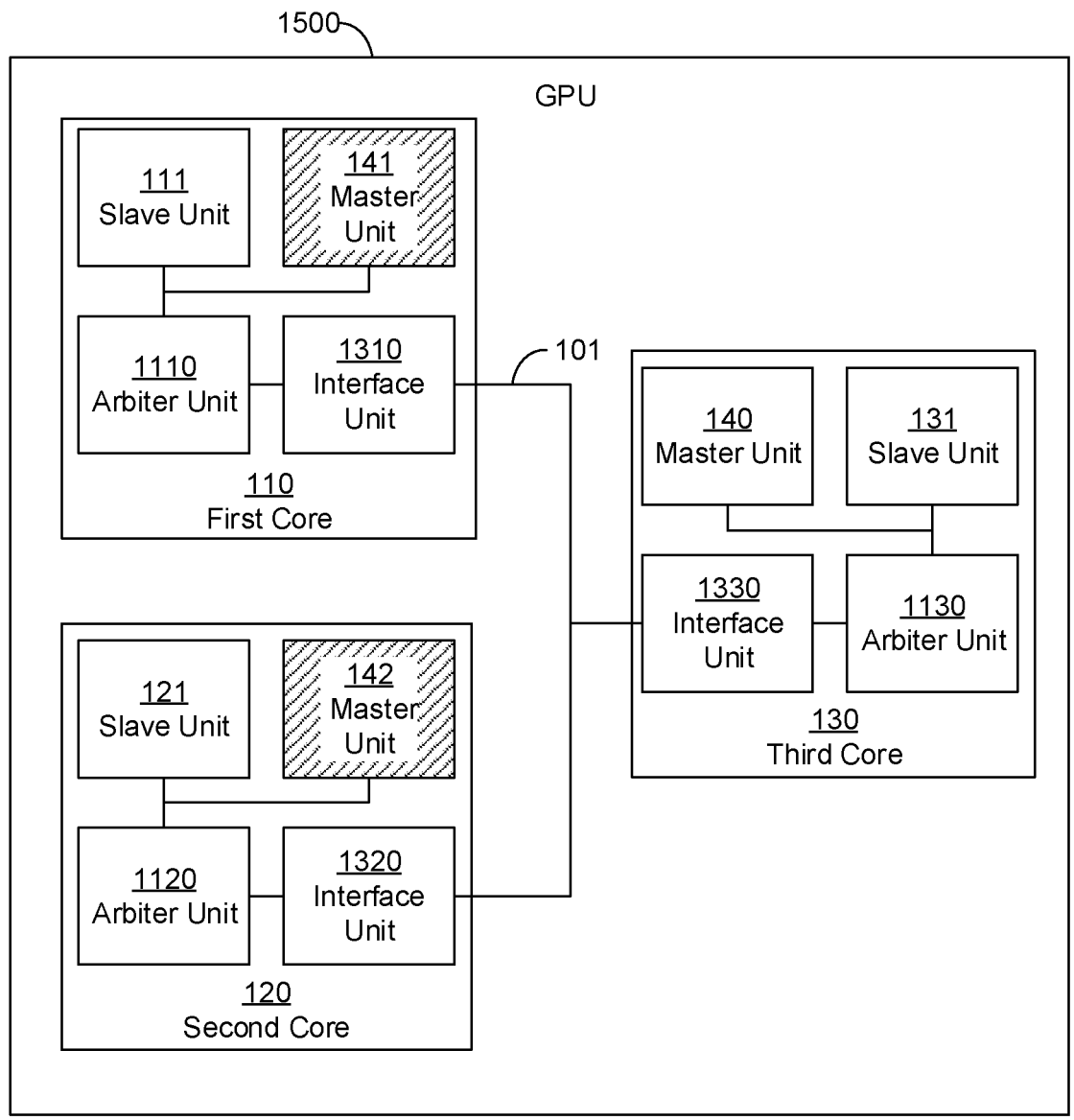
FIG. 15 is a block diagram of a GPU according to an example.

In some examples, the first, second and third cores 110, 120, 130 (and more generally, all of the cores of the GPU) each comprise both an interface unit and an arbiter unit. An example of this is depicted in FIG. 15. In FIG. 15, each core 110, 120, 130 of the GPU 1500 comprises: a master unit 140, 141, 142; a slave unit 131, 132, 133; an arbiter unit 1110, 1120, 1130 and an interface unit 1310, 1320, 1330. Each interface unit 1310, 1320, 1330 is connected to the register bus 101 and to the arbiter unit 1110, 1120, 1130 of its core. Each arbiter unit 1110, 1120, 1130 is in communication with the slave unit 111, 121, 131 of its core and the master unit 140, 141, 142 of its core. As explained above, because each core only comprises a single slave unit, only one master unit in the GPU 1500 is active. In this example, it is the master unit 140 of the third core 130. The inactivity of the master units 141, 142 of the first and second cores 110, 120 is indicated by diagonal hatching.

Figure 16:
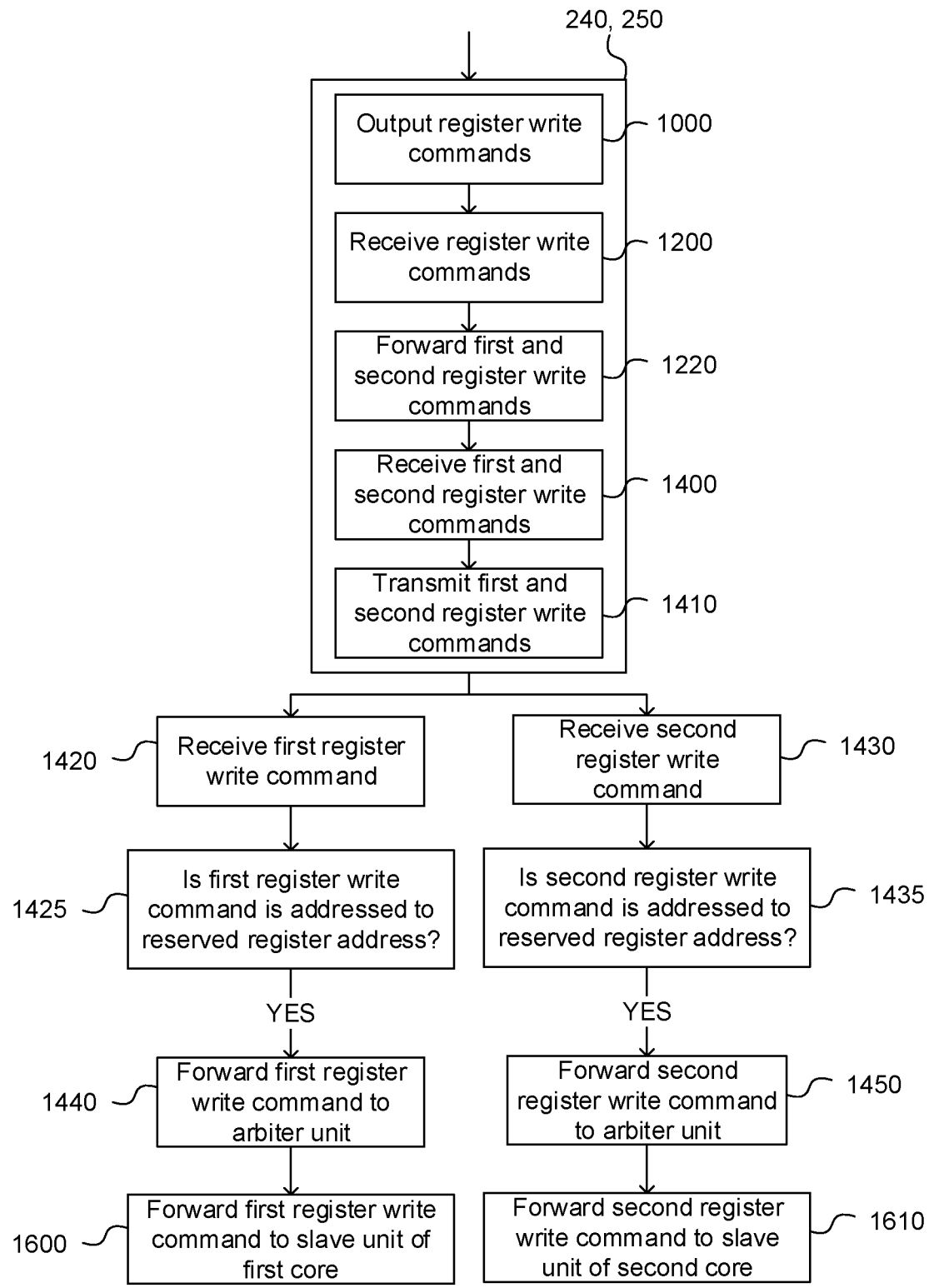
FIG. 16 is a flowchart illustrating a method according to an example.

FIG. 16 is a flow chart depicting an exemplary method performed by the GPU 1500 of FIG. 15. For the purpose of this example, it is assumed that the method steps preceding the transmission 240, 250 of the first and second subsets are the same as for FIG. 2.

In step 1000 the master unit 140 outputs 1000 the first and second register write commands. In step 1200 the arbiter unit 1130 receives the first and second register write commands. Because neither of the commands is addressed to a slave unit within the third core 130, the arbiter unit 1130 forwards 1220 the first and second register write commands, sending them to the interface unit 1330 of the third core 130. The interface unit 1330 transmits 1410 the first register write command to the first core 110 and the second register write command to the second core 120 over the register bus 101. The interface unit 1310 of the first core 130 receives 1420 the first register write command, and upon determining 1425 that it is addressed to a reserved register address, forwards 1440 the first register write command to the arbiter unit 1110. The arbiter unit 1110 forwards 1600 the first register write command (or the data contained therein) to the slave unit 111 of the first core 110 (the slave unit to which it was addressed). Similarly, the interface unit 1320 of the second core 120 receives 1430 the second register write command and, upon determining 1435 that it is addressed to a reserved register address, forwards 1450 the second register write command to the arbiter unit 1120. The arbiter unit 1120 in turn forwards 1610 the second register write command (or the data contained therein) sending it to the slave unit of the second core 120.

Any communication sent by a slave unit 111, 121 of the first or second cores 110, 120 can be sent to the master unit 140 in a similar way. Communications sent by a slave unit may include a credit notification, a task completion update and a CFI notification, by way of example. The communication may be in the form of a register read or write command and may be addressed to a reserved register address associated with the master unit 140. For example, the slave unit 111 of the first core 110 can output a credit notification when the first core 110 completes a task. The arbiter unit 1110 can receive this credit notification, and upon determining that it is not addressed to the master unit 141 of the first core 110, can forward the credit notification to the interface unit 1310. The interface unit 1310 can transmit the credit notification to the master unit 140. The interface unit 1330 of the third core 130 can receive the credit notification and, on determining that it is addressed to a reserved register address, can forward it to the arbiter unit 1130. The arbiter unit 1130 can then forward the credit notification to the master unit 140.

Where the slave unit 131 of the third core 130 transmits a communication addressed to the master unit 140 of the same core, this communication can be routed to the master unit 140 by the arbiter unit 1130 without being forwarded to the interface unit 1330 or register bus 101.

Figure 17:
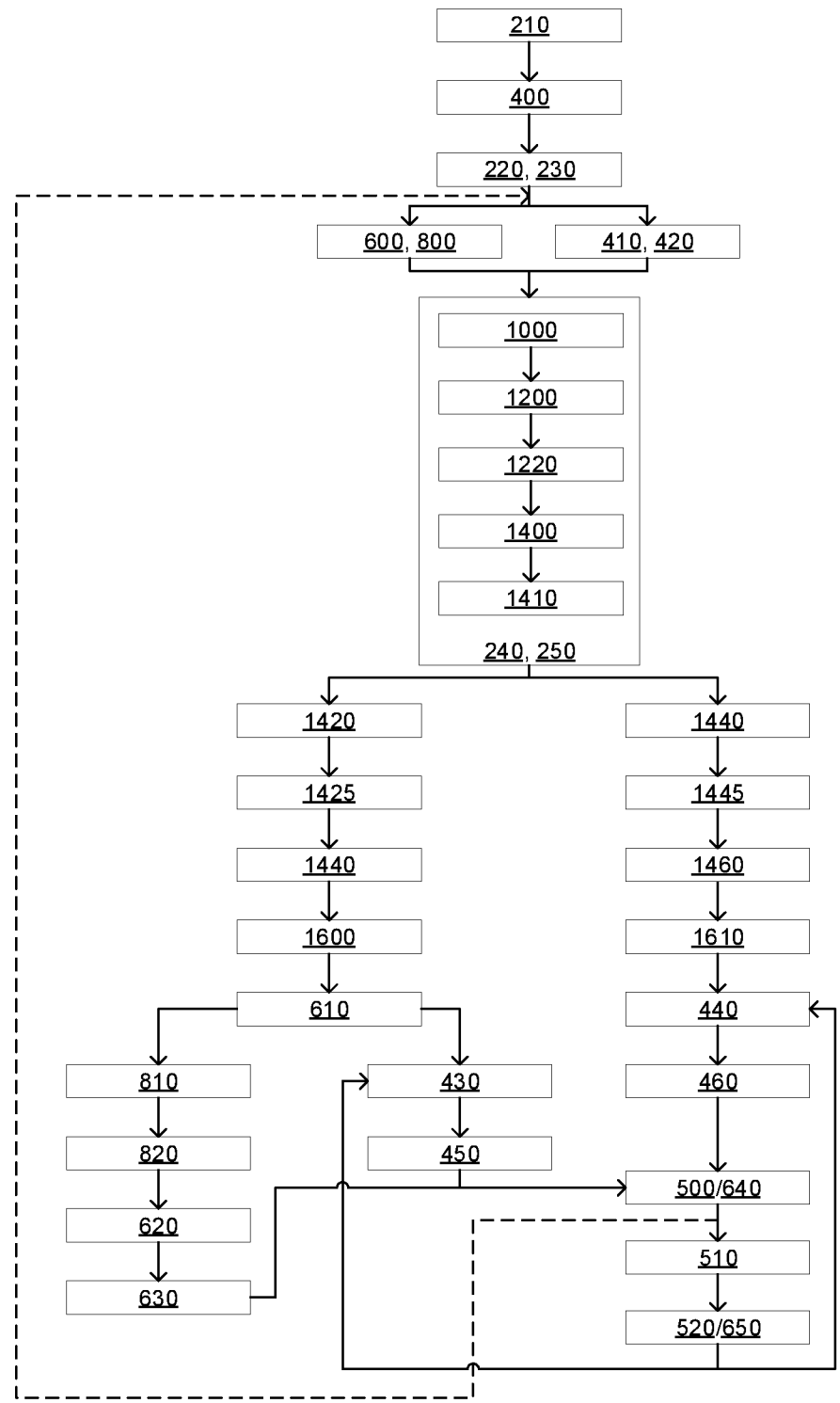
FIG. 17 is a flowchart illustrating a method according to an example.

It should be understood that, just as the methods of FIGS. 12 and 14A can be combined to produce the method depicted in FIG. 15, any combination of the other methods disclosed above is also valid. For example, FIG. 17 depicts a composite method including the steps of FIGS. 5, 8 and 15 and that can be performed on the GPU of FIG. 16, or a similar GPU lacking the master units 141 and 142.

It should be noted that some method steps depicted overlap, which is indicated by a slash between reference numerals. For example, steps 500 and 640 overlap. This means that the subsequent task assigned to the core with the least work (step 500) can also be the dependent task referenced in step 640.

In some examples, the subsequent task assigned in step 500 is a first task. In this case, the master unit 140 can insert a task completion update command and memory flush command, as has been described above for first tasks. This is depicted by looping the method with the dashed arrow.

It should be understood that the transmitting 520/650 can include all of the same steps as the transmitting 240 or 250.

The method depicted in FIG. 17 can be performed by the GPU, following the various loops shown until there are no subsequent tasks to be assigned and transmitted.

In any of the examples described above, each core of the GPU may be identical. This means that each core may comprise the same number of master and slave units, as well as arbiter and interface units. Furthermore, each master unit may be the same, each slave unit may be the same, each arbiter unit may be the same and each interface unit may be the same.

The majority of the examples described above have been in reference to a GPU comprising at least three cores, in which a third core comprises an active master unit. However, it should be understood that features described in these examples can be generalised to other GPUs having two or more cores, and in which one of the first and second cores comprises the active master unit.

Figure 18:
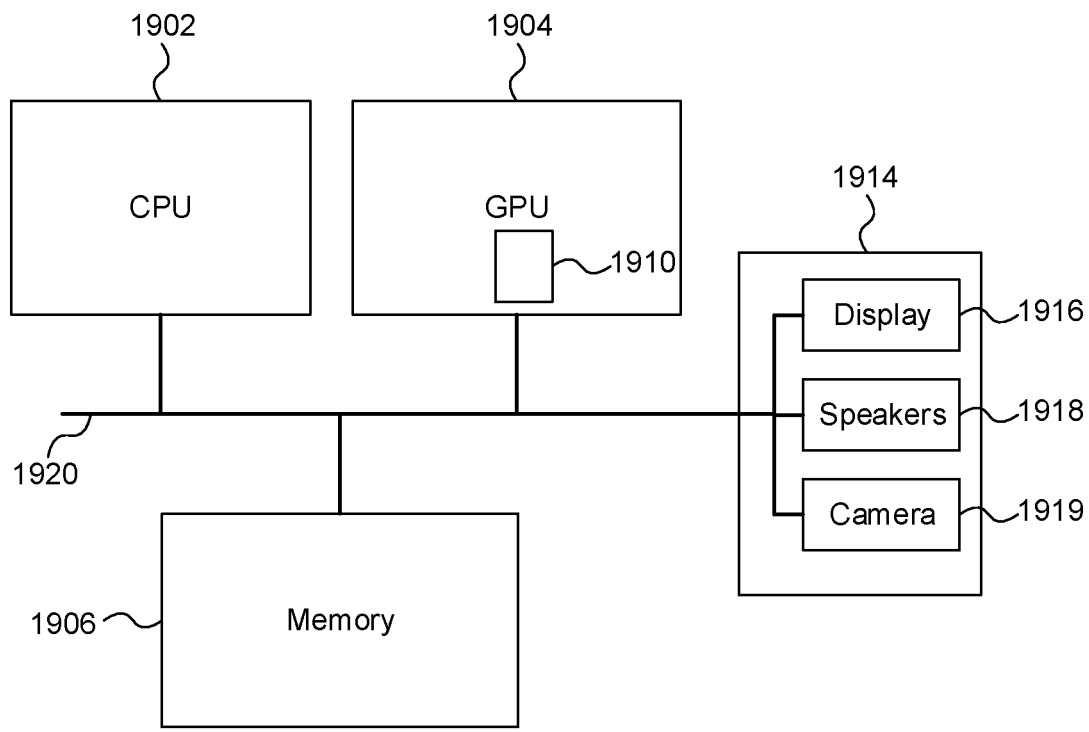
FIG. 18 shows a computer system in which a graphics processing system is implemented.

FIG. 18 shows a computer system in which the graphics processing systems described herein may be implemented. The computer system comprises a CPU 1902, a GPU 1904, a memory 1906 and other devices 1914, such as a display 1916, speakers 1918 and a camera 1919. A processing block 1910 (corresponding to cores 110, 120, 130, and the register bus 101) is implemented on the GPU 1904. In other examples, the processing block 1910 may be implemented on the CPU 1902. The components of the computer system can communicate with each other via a communications bus 1920.

The GPUs of FIGS. 1, 3, 7, 9, 11, 13 and 15 are shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The GPUs described herein may be embodied in hardware on an integrated circuit. The GPUs described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods.

Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU or graphics processing system configured to perform any of the methods described herein, or to manufacture a GPU or graphics processing system comprising any apparatus described herein. An integrated circuit definition dataset may be, for example, an integrated circuit description.

Therefore, there may be provided a method of manufacturing, at an integrated circuit manufacturing system, a GPU or graphics processing system as described herein. Furthermore, there may be provided an integrated circuit definition dataset that, when processed in an integrated circuit manufacturing system, causes the method of manufacturing a GPU or graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU or graphics processing system will now be described with respect to FIG. 19.

Figure 19:
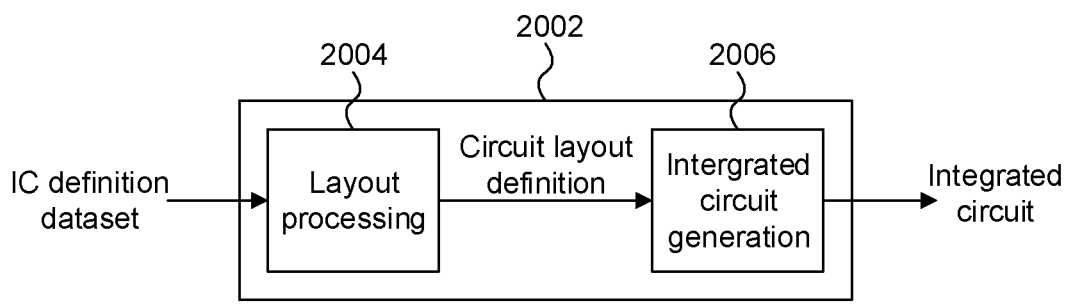
FIG. 19 shows an integrated circuit manufacturing system for generating an integrated circuit embodying a graphics processing system.

FIG. 19 shows an example of an integrated circuit (IC) manufacturing system 2002 which is configured to manufacture a GPU or graphics processing system as described in any of the examples herein. In particular, the IC manufacturing system 2002 comprises a layout processing system 2004 and an integrated circuit generation system 2006. The IC manufacturing system 2002 is configured to receive an IC definition dataset (e.g. defining a GPU or graphics processing system as described in any of the examples herein), process the IC definition dataset, and generate an IC according to the IC definition dataset (e.g. which embodies a GPU or graphics processing system as described in any of the examples herein). The processing of the IC definition dataset configures the IC manufacturing system 2002 to manufacture an integrated circuit embodying a GPU or graphics processing system as described in any of the examples herein.

The layout processing system 2004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 2006 generates an IC according to the circuit layout definition, as is known in the art. For example, the IC generation system 2006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2006 may be in the form of computer-readable code which the IC generation system 2006 can use to form a suitable mask for use in generating an IC.

The different processes performed by the IC manufacturing system 2002 may be implemented all in one location, e.g. by one party. Alternatively, the IC manufacturing system 2002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU or graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit comprising a plurality of cores, wherein each core of the plurality of cores comprises a slave unit configured to manage the execution of image rendering tasks within the core, and wherein at least one of the plurality of cores further comprises a master unit configured to:
   receive a set of image rendering tasks;
   assign a first subset of the image rendering tasks to a first core of the plurality of cores;
   assign a second subset of the image rendering tasks to a second core of the plurality of cores;
   transmit the first subset of the image rendering tasks to the slave unit of the first core; and
   transmit the second subset of the image rendering tasks to the slave unit of the second core;
   wherein:
   the slave unit of the first core is configured to transmit to the master unit a first credit notification when a task in the first subset of the image rendering tasks has been processed,
   the slave unit of the second core is configured to transmit to the master unit a second credit notification when a task in the second subset of the image rendering tasks has been processed; and
   the master unit is configured to:
   store a credit number for each of the first and second cores,
   adjust the credit number of the first core by a first amount for each task in the first subset of the image rendering tasks when the master unit assigns the first subset of the image rendering tasks to the first core,
   adjust the credit number of the second core by the first amount for each task in the second subset of the image rendering tasks when the master unit assigns the second subset of the image rendering tasks to the second core,
   adjust the credit number of the first core by a second amount when the master unit receives the first credit notification, and
   adjust the credit number of the second core by the second amount when the master unit receives the second credit notification, wherein one of the first and second amounts is positive, and the other is negative.

2. The graphics processing unit of claim 1, wherein the master unit is configured to:
   assign a subsequent image rendering task to the slave unit of the core with the least work currently assigned to it, based on the credit number of each of the cores;
   adjust the credit number of the core to which the subsequent image rendering task has been assigned by the first amount; and
   transmit the subsequent image rendering task to the slave unit of the core to which it has been assigned.

3. The graphics processing unit of claim 2, wherein:
   the first core comprises a first number of available processing units (PUs), configured to perform rendering operations, and the second core comprises a second number of available PUs; and
   the master unit assigns image rendering tasks to the first and second cores in direct relation to the first and second numbers of available PUs.

4. The graphics processing unit of claim 1, wherein:
   the first subset of the image rendering tasks comprises a first task, wherein the first task is a task on which a dependent task depends;
   the master unit is configured to include, in the first subset of the image rendering tasks and following the first task, a task completion update command;
   the slave unit of the first core is configured to send a first task completion update to the master unit when the first core processes the task completion update command;
   the master unit is configured to assign and transmit a dependent task of the first task to one of the slave units of the first and second cores only after the master unit has received the first task completion update; and
   the dependent task of the first task is a task that depends on the results of the first task.

5. The graphics processing unit of claim 1, wherein each core in the plurality of cores comprises a second slave unit configured to manage the execution of a second type of image rendering task by the core, and wherein one of the cores comprises a second master unit configured to:
   receive a second set of image rendering tasks of the second type;
   assign a first subset of the second set of image rendering tasks to a first one of the plurality of cores;
   assign a second subset of the second set of image rendering tasks to a second, different one of the plurality of cores;
   transmit the first subset of the second set of image rendering tasks to the second slave unit of the first one of the plurality of cores; and
   transmit the second subset of the second set of image rendering tasks to the second slave unit of the second one of the plurality of cores.

6. The graphics processing unit of claim 1, wherein:
   the master unit is configured to output first and second register write commands;
   the first register write command is addressed to the first core and comprises an indication of the first subset of the image rendering tasks, and the second register write command is addressed to the second core and comprises an indication of the second subset of the image rendering tasks; and
   the plurality of cores are connected by a register bus configured to communicate register write commands between the cores.

7. The graphics processing unit of claim 6, wherein at least the core comprising the master unit further comprises an arbiter unit in communication with the master unit and the slave unit of the core, wherein the arbiter unit is configured to:
   receive the register write commands from the master unit; and
   for each register write command:
   if the register write command is addressed to the core comprising the master unit, pass the register write command to the slave unit of the core comprising the master unit; and
   if the register write command is not addressed to the core comprising the master unit, forward the register write command for transmission over the register bus.

8. The graphics processing unit of claim 6, wherein the plurality of cores each comprise an interface unit in communication with the register bus, wherein the interface unit of the core comprising the master unit is configured to:
  receive the first and second register write commands; and
  transmit, over the register bus, the first register write command to the first core and the second register write command to the second core;
wherein the interface unit of the first core is configured to:
  receive, via the register bus, the first register write command, and
  forward the first register write command to the slave unit of the first core;
and wherein the interface unit of the second core is configured to:
  receive, via the register bus, the second register write command, and
  forward the second register write command to the slave unit of the second core.

9. The graphics processing unit of claim 8, wherein the interface unit of the first core is configured to:
  determine whether the first register write command is addressed to a first reserved register address; and
  if the first register write command is addressed to the first reserved register address, forward the first register write command to the slave unit of the first core, and
wherein the interface unit of the second core is configured to:
  determine whether the second register write command is addressed to a second reserved register address; and
  if the second register write command is addressed to the second reserved register address, forward the second register write command to the slave unit of the second core.

10. A method of transmitting image rendering tasks in a graphics processing unit comprising a plurality of cores, the method comprising:
  receiving, by a master unit in a core of the plurality of cores, a set of image rendering tasks;
  assigning, by the master unit, a first subset of the image rendering tasks to a first core of the plurality of cores;
  assigning, by the master unit, a second subset of the image rendering tasks to a second core of the plurality of cores;
  transmitting, by the master unit, the first subset of image rendering tasks to a slave unit of the first core;
  transmitting, by the master unit, the second subset of image rendering tasks to a slave unit of the second core;
  storing, by the master unit, a credit number for each of the first and second cores;
  adjusting, by the master unit, the credit number of the first core by a first amount for each task in the first subset of the image rendering tasks; and
  adjusting, by the master unit, the credit number of the second core by the first amount for each task in the second subset of image rendering tasks;
  transmitting, by the slave unit of the first core to the master unit, a first credit notification when a task in the first subset of image rendering tasks has been processed;
  transmitting, by the slave unit of the second core to the master unit, a second credit notification when a task in the second subset of image rendering tasks has been processed;
  adjusting, by the master unit, the credit number of the first core by a second amount when the master unit receives the first credit notification; and
  adjusting, by the master unit, the credit number of the second core by the second amount when the master unit receives the second credit notification, wherein one of the first and second amounts is positive, and the other is negative.

11. The method of claim 10, further comprising:
  assigning, by the master unit, a subsequent image rendering task to the slave unit of the core with the least work currently assigned to it, based on the credit number of each of the cores;
  adjusting, by the master unit, the credit number of the core to which the subsequent image rendering task has been assigned by the first amount; and
  transmitting, by the master unit, the subsequent image rendering task to the slave unit of the core to which it has been assigned.

12. The method of claim 10, further comprising:
  assigning image rendering tasks to the first and second cores in direct relation to a first number of available processing units (PUs), and to a second number of available PUs, wherein the first number of available PUs is the number of available PUs in the first core and the second number of available PUs is the number of available PUs in the second core.

13. The method of claim 10, wherein the method comprises:
  including, by the master unit, after a first task in the first subset of the image rendering tasks, a task completion update command;
  processing, by the first core, the first task;
  processing, by the first core, the task completion update command; and
  transmitting, by the slave unit of the first core, a task completion update to the master unit;
  assigning, by the master unit, a dependent task of the first task to one of the slave units of the first and second cores; and
  transmitting, by the master unit, the dependent task to the core to which it has been assigned.

14. The method of claim 13, further comprising:
  including, by the master unit, after the first task in the first subset of the image rendering tasks and optionally before the task completion update command, a memory flush command;
  processing, by the first core, the memory flush command; and
  writing, by the slave unit of the first core, all output data stored in the first core to a shared memory.

15. The method of claim 10, further comprising:
  receiving, by a second master unit in any one of the plurality of cores, a second set of image rendering tasks of a second type;
  assigning, by the second master unit, a first subset of the second set of image rendering tasks to the first core;
  assigning, by the second master unit, a second subset of the second set of image rendering tasks to the second core;
  transmitting, by the second master unit, the first subset of the second set of image rendering tasks to a second slave unit of the first core; and
  transmitting, by the second master unit, the second subset of the second set of image rendering tasks to a second slave unit of the second core.

16. The method of claim 10, wherein:
  the transmitting of the first and second subsets comprises outputting, by the master unit, first and second register write commands;
  the first register write command is addressed to the first core and comprises an indication of the first subset of the image rendering tasks, and the second register write command is addressed to the second core and comprises an indication of the second subset of the image rendering tasks; and the plurality of cores are connected by a register bus for communicating the register write commands between the cores.

17. A method of manufacturing a graphics processing unit as set forth in claim 1, the method comprising inputting to an integrated circuit manufacturing system an integrated circuit definition dataset that, when processed in said integrated circuit manufacturing system, configures the integrated circuit manufacturing system to manufacture said graphics processing unit.

18. A non-transitory computer readable storage medium having stored thereon computer readable code configured to cause the method as set forth in claim 10 to be performed when the code is run.

19. A non-transitory computer readable storage medium having stored thereon a computer readable dataset description of a graphics processing unit as set forth in claim 1 that, when processed in an integrated circuit manufacturing system, causes the integrated circuit manufacturing system to manufacture an integrated circuit embodying the graphics processing unit.

20. An integrated circuit manufacturing system comprising:
- a non-transitory computer readable storage medium having stored thereon a computer readable dataset description of a graphics processing unit as set forth in claim 1;
- a layout processing system configured to process the computer readable dataset description so as to generate a circuit layout description of an integrated circuit embodying the graphics processing unit; and
- an integrated circuit generation system configured to manufacture the graphics processing unit according to the circuit layout description.

* * * * *